US008659585B2

(12) United States Patent
Hikosaka

(10) Patent No.: US 8,659,585 B2
(45) Date of Patent: Feb. 25, 2014

(54) PROJECTOR APPARATUS AND PROJECTION IMAGE CORRECTING PROGRAM PRODUCT

(75) Inventor: Kentaro Hikosaka, Tokyo (JP)

(73) Assignee: Nikon Corporation, Tokyo (JP)

( * ) Notice: Subject to any disclaimer, the term of this patent is extended or adjusted under 35 U.S.C. 154(b) by 503 days.

(21) Appl. No.: 12/899,901

(22) Filed: Oct. 7, 2010

(65) Prior Publication Data

US 2011/0169854 A1   Jul. 14, 2011

(30) Foreign Application Priority Data

Oct. 16, 2009 (JP) .................................. 2009-239138
Jun. 17, 2010 (JP) .................................. 2010-138442

(51) Int. Cl.
G09G 3/16 (2006.01)
G09G 3/30 (2006.01)
G09G 5/10 (2006.01)
H04N 5/57 (2006.01)
H04N 5/64 (2006.01)
G03F 3/08 (2006.01)
G03B 21/56 (2006.01)

(52) U.S. Cl.
USPC ............... 345/207; 345/690; 345/48; 345/77; 348/602; 348/687; 348/744; 358/509; 358/518; 359/443; 349/5

(58) Field of Classification Search
USPC ................. 345/581, 589–590, 591, 593–594, 345/600–601, 606, 611, 618–619, 643, 660, 345/204, 207, 690, 22, 48, 63, 76–77, 84, 345/87–88; 348/253–254, 552, 557, 571, 348/576–577, 630, 655, 687, 739, 602, 735, 348/744; 349/5–8, 70, 72; 359/443, 449, 359/456, 507, 577, 584; 358/509, 518, 519, 358/516
See application file for complete search history.

(56) References Cited

U.S. PATENT DOCUMENTS 5,995,303 A * 11/1999 Honguh et al. ................ 359/708
6,049,384 A *  4/2000 Rudd et al. .................... 356/603
(Continued)

FOREIGN PATENT DOCUMENTS

JP   A-2006-162995    6/2006
JP   A-2007-81611     3/2007
(Continued)

OTHER PUBLICATIONS

Jan. 17, 2012 Office Action issued in Japanese Patent Application No. 2009-239138 (with translation).
(Continued)

Primary Examiner — Wesner Sajous
(74) Attorney, Agent, or Firm — Oliff PLC

(57) ABSTRACT

A projector apparatus includes: a projection unit that projects an image onto a projection surface; a reflectance distribution detection unit that detects a reflectance distribution at the projection surface; a density distribution detection unit that detects a density distribution of a base pattern at the projection surface; a smoothing unit that smooths the reflectance distribution and the density distribution; an input unit that inputs image data; a correction unit that corrects the input image data based upon the smoothed reflectance distribution, the smoothed density distribution and input/output characteristics of the projection unit; and a control unit that controls the projection unit so as to project the image based upon the image data having been corrected.

22 Claims, 38 Drawing Sheets

(56) References Cited

U.S. PATENT DOCUMENTS

| | | | |
|---|---|---|---|
| 6,888,595 B2* | 5/2005 | Umemoto | 349/113 |
| 8,382,289 B2* | 2/2013 | Hikosaka | 353/69 |
| 2002/0033916 A1* | 3/2002 | Umemoto | 349/113 |
| 2006/0139490 A1* | 6/2006 | Fekkes et al. | 348/515 |
| 2009/0058873 A1 | 3/2009 | Elliott et al. | |
| 2010/0134643 A1 | 6/2010 | Koishi | |
| 2010/0201894 A1 | 8/2010 | Nakayama et al. | |
| 2010/0227769 A1* | 9/2010 | Schulz et al. | 506/9 |
| 2010/0265403 A1 | 10/2010 | Hikosaka | |
| 2010/0277498 A1 | 11/2010 | Elliott et al. | |
| 2011/0018897 A1 | 1/2011 | Uchiyama et al. | |
| 2011/0304926 A1* | 12/2011 | Mueller et al. | 359/730 |

FOREIGN PATENT DOCUMENTS

| | | |
|---|---|---|
| JP | A-2007-322671 | 12/2007 |
| JP | A-2008-67080 | 3/2008 |
| JP | A-2008-546006 | 12/2008 |
| WO | WO 2008/156050 A1 | 12/2008 |
| WO | WO 2009/088080 A1 | 7/2009 |

OTHER PUBLICATIONS

May 17, 2012 Office Action issued in U.S. Appl. No. 12/756,678.
Japanese Office Action dated Sep. 11, 2012 from Japanese Patent Application No. 2009-239138 (with English-language translation).
Apr. 24, 2012 Notification of Reasons for Refusal issued in Japanese Patent Application No. 2010-138442 (with translation).

* cited by examiner $$\frac{1.0+0.8+1.0+0.6+0.3+0.5+0.5+0.7+0.9}{9} = 0.7$$

| 0.8 | 0.9 | 1.0 | 0.9 |
| --- | --- | --- | --- |
| 0.7 | 0.9 | 1.0 | 0.9 |
| 0.5 | 0.8 | 0.9 | 0.9 |
| 0.7 | 0.8 | 0.9 | 0.8 |

| 1.0 | 1.0 | 1.0 | 1.0 |
| --- | --- | --- | --- |
| 1.0 | 1.0 | 1.0 | 1.0 |
| 1.0 | 1.0 | 1.0 | 1.0 |
| 1.0 | 1.0 | 1.0 | 1.0 |

PROJECTOR APPARATUS AND PROJECTION IMAGE CORRECTING PROGRAM PRODUCT

INCORPORATION BY REFERENCE

The disclosures of the following priority applications are herein Incorporated by reference:
Japanese Patent Application No. 2009-239138 filed Oct. 16, 2009
Japanese Patent Application No. 2010-138442 filed Jun. 17, 2010

BACKGROUND OF THE INVENTION

1. Field of the Invention

The present invention relates to a projector apparatus and a projection image correcting program.

2. Description of Related Art

Projectors, which are becoming increasingly compact and thus more mobile units, are often used to project images onto projection surfaces other than screens, such as walls. However, the quality of an image projected onto a colored or patterned projection surface is bound to be adversely affected by the color or the pattern at the projection surface. Japanese Laid Open Patent Publication No. 2008-67080 and Japanese Laid Open Patent Publication No. 2007-322671 each disclose a technology whereby an image corrected in correspondence to the reflectance distribution at the projection surface is projected so as to render the color or the pattern at the projection surface less noticeable in the projected image.

SUMMARY OF THE INVENTION

The technologies in the related art described above, adopted when correcting an input image, are yet to effectively address the following issue. When an image is projected in an environment where ambient light (light other than the light originating from the projector apparatus) is present or an image is projected onto a projection surface at which areas with extremely low reflectance, such as black streaks or spots, are present, the correction executed for the image before it is projected onto the projection surface is bound to greatly lower the brightness of the projection image. Such a reduction in the brightness of the projection image will adversely affect the quality of the projection image.

According to the 1st aspect of the present invention, a projector apparatus comprises: a projection unit that projects an image onto a projection surface; a reflectance distribution detection unit that detects a reflectance distribution at the projection surface; a density distribution detection unit that detects a density distribution of a base pattern at the projection surface; a smoothing unit that smooths the reflectance distribution and the density distribution; an input unit that inputs image data; a correction unit that corrects the input image data based upon the smoothed reflectance distribution, the smoothed density distribution and input/output characteristics of the projection unit; and a control unit that controls the projection unit so as to project the image based upon the image data having been corrected.

According to the 2nd aspect of the present invention, it is preferred that in a projector apparatus according to the 1st aspect, the input/output characteristics of the projection unit indicate an extent to which brightness of a projection image is enhanced.

According to the 3rd aspect of the present invention, the correction unit of a projector apparatus according to the 2nd aspect may execute size conversion so as to convert a data size of data expressing the density distribution to a size smaller than a data size of the image projected by the projection unit and obtains correction information through calculation based upon the reflectance distribution and the density distribution having undergone the size conversion, the correction information being for using to cancel out an appearance of the base pattern at the projection surface.

According to the 4th aspect of the present invention, it is preferred that in a projector apparatus according to the 3rd aspect, the correction unit also generates a possible/impossible distribution image based upon the correction information, the image data input from the input unit, the reflectance distribution and the extent to which the brightness of the projection image is enhanced, the possible/impossible distribution image indicating a possible/impossible distribution with regard to cancellation of the appearance of the base pattern; executes size conversion so as to convert data sizes of data expressing the possible/impossible distribution image and the input image data each to a size smaller than the data size of the image projected by the projection unit; and corrects the input image data by using the possible/impossible distribution image having undergone the size conversion, the input image data having undergone the size conversion, the reflectance distribution and the correction information.

According to the 5th aspect of the present invention, the correction unit of a projector apparatus according to the 3rd aspect may obtain a plurality of sets of the correction information through calculation based upon the density distribution having undergone the size conversion, each set of the correction information being in correspondence to each specific area present in a projection image plane respectively.

According to the 6th aspect of the present invention, the correction unit of a projector apparatus according to the 3rd aspect may adjust density distribution to achieve uniformity at a projection image plane based upon a maximum value in the density distribution having undergone the size conversion and obtains a plurality of sets of the correction information through calculation based upon the density distribution achieving uniformity, each set of the correction information being in correspondence to each specific area present in a projection image plane respectively.

According to the 7th aspect of the present invention, the correction unit of a projector apparatus according to the 4th aspect may indicate the extent to which the brightness is enhanced based upon a whiteness component enhancement level.

According to the 8th aspect of the present invention, it is preferred that the correction unit of a projector apparatus according to the 4th aspect executes arithmetic operations required to correct the input image data based upon the possible/impossible distribution having undergone the size conversion, each of the arithmetic operations being executed in correspondence to each specific area present in a projection image plane respectively.

According to the 9th aspect of the present invention, the correction unit of a projector apparatus according to the 4th aspect may adjust the possible/impossible distribution so as to achieve uniformity at a projection image plane based upon a minimum value indicated in the possible/impossible distribution having undergone the size conversion and executes arithmetic operation required to correct the input image data based upon the possible/impossible distribution achieving uniformity.

According to the 10th aspect of the present invention, it is preferred that in a projector apparatus according to the 1st aspect, when the projection unit enhances brightness of a projection image, the correction unit corrects the input image data based upon the smoothed reflectance distribution, the smoothed density distribution and input/output characteristics of the projection unit exclusively related to color component signals.

According to the 11th aspect of the present invention, the projection unit of a projector apparatus according to the 10th aspect may be equipped with an optical image generating element that includes pixels corresponding to the color component signals based upon the image data and pixels used for brightness enhancement and the projection unit projects an image generated by the optical image generating element.

According to the 12th aspect of the present invention, the correction unit of a projector apparatus according to the 10th aspect may execute size conversion so as to convert a data size of data expressing the density distribution to a size smaller than a data size of the image projected by the projection unit and obtains correction information through calculation based upon the reflectance distribution and the density distribution having undergone the size conversion, the correction information being for using to cancel out an appearance of the base pattern at the projection surface.

According to the 13th aspect of the present invention, it is preferred that in a projector apparatus according to the 12th aspect, the correction unit also generates a possible/impossible distribution image based upon the correction information, the image data input from the input unit, the reflectance distribution and the input/output characteristics, the possible/impossible distribution image indicating a possible/impossible distribution with regard to cancellation of the appearance of the base pattern; executes size conversion so as to convert data sizes of data expressing the possible/impossible distribution image and the input image data each to a size smaller than the data size of the image projected by the projection unit; and corrects the input image data by using the possible/impossible distribution image having undergone the size conversion, the input image data having undergone the size conversion, the reflectance distribution and the correction information.

According to the 14th aspect of the present invention, the correction unit of a projector apparatus according to the 12th aspect may obtain a plurality of sets of the correction information through calculation based upon the density distribution having undergone the size conversion, each set of the correction information being in correspondence to each specific area present in a projection image plane respectively.

According to the 15th aspect of the present invention, the correction unit of a projector apparatus according to the 12th aspect may adjust density distribution to achieve uniformity at a projection image plane based upon a maximum value in the density distribution having undergone the size conversion and obtains a plurality of sets of the correction information through calculation based upon the density distribution achieving uniformity, each set of the correction information being in correspondence to each specific area present in a projection image plane respectively.

According to the 16th aspect of the present invention, it is preferred that in a projector apparatus according to the 13th aspect, the correction unit executes arithmetic operations required to correct the input image data in correspondence to each specific area present in a projection image plane based upon the possible/impossible distribution having undergone the size conversion, each of the arithmetic operations being executed in correspondence to each specific area present in a projection image plane respectively.

According to the 17th aspect of the present invention, it is preferred that in a projector apparatus according to the 13th aspect, the correction unit adjusts the possible/impossible distribution so as to achieve uniformity at a projection image plane based upon a minimum value in the possible/impossible distribution having undergone the size conversion and executes arithmetic operation required to correct the input image data based upon the possible/impossible distribution achieving uniformity.

According to the 18th aspect of the present invention, a computer-readable program product containing a computer-executable projection image correcting program that enables a computer to execute: detection processing for detecting a reflectance distribution at the projection surface; density distribution detection processing for detecting a density distribution of a base pattern at a projection surface; smoothing processing for smoothing the reflectance distribution and the density distribution; input processing for inputting image data; correction processing for correcting the image data having been input based upon the smoothed reflectance distribution, the smoothed density distribution and input/output characteristics of a projector apparatus; and processing for projecting an image based upon the image data having been corrected.

According to the 19th aspect of the present invention, it is preferred that a computer-readable program product containing a computer-executable projection image correcting program according to the 18th aspect, when the projector apparatus enhances brightness of a projection image, the projection image correcting program enables a computer to execute the correction processing for correcting the image data having been input based upon the smoothed reflectance distribution, the smoothed density distribution and input/output characteristics of the projector apparatus exclusively related to color component signals.

DESCRIPTION OF PREFERRED EMBODIMENT

The following is a description of an embodiment of the present invention, given in reference to drawings. The projector apparatus according to the present invention corrects an input image in correspondence to the conditions at the projection surface so as to improve the appearance and the quality of the projected image.

Figure 1:
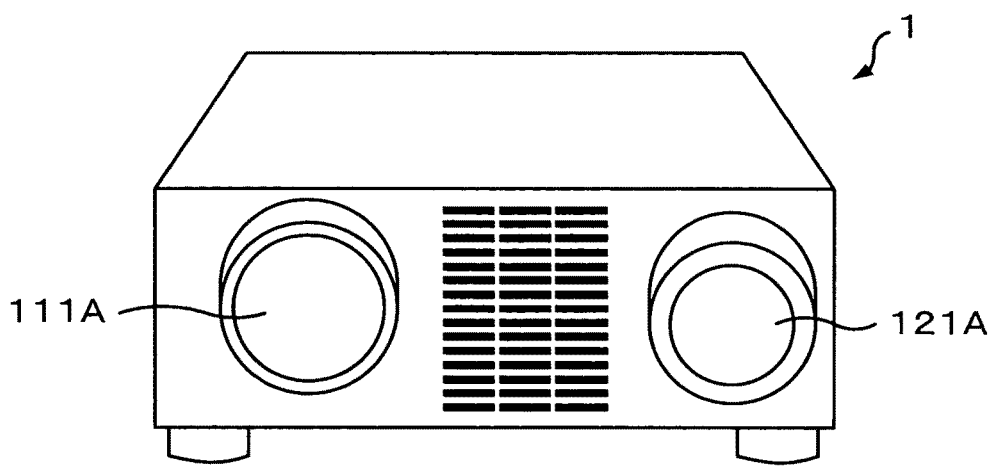
FIG. 1 is an external view of the projector apparatus achieved in an embodiment of the present invention.

FIG. 1 shows a projector apparatus 1 achieved in the embodiment of the present invention viewed from the front side. FIG. 1 shows a projection lens 111A constituting a projection optical system 111 (see FIG. 2) and a photographic lens 121A constituting an imaging optical system 121 (see FIG. 2), both disposed on the front side of the projector apparatus 1. The projector apparatus 1, placed on a desktop or the like, projects an image or the like from a built-in projection unit 110 (see FIG. 2) toward a screen or the like present in front thereof.

Figure 2:
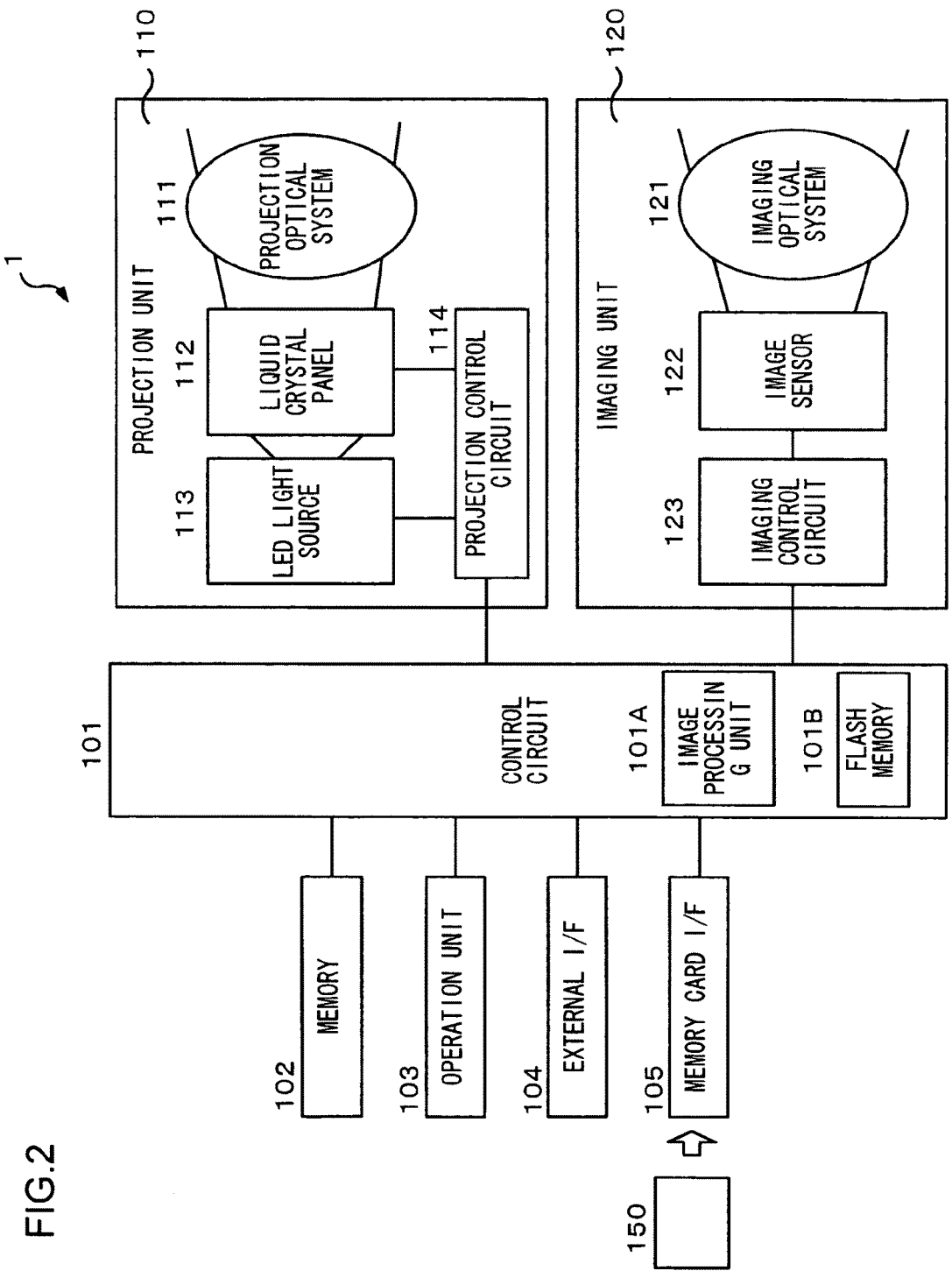
FIG. 2 is a block diagram showing the structure adopted in the projector apparatus.

FIG. 2 is a block diagram showing an example of a structure that may be adopted in the projector apparatus 1. The projector apparatus 1 in FIG. 2 includes the projection unit 110, an imaging unit 120, a control circuit 101, a memory 102, an operation unit 103, an external interface (I/F) circuit 104 and a memory card interface (I/F) 105. A memory card 150 can be loaded at the memory card interface 105.

The control circuit 101 is constituted with a microprocessor and its peripheral circuits. Based upon a control program stored in a built-in flash memory 101B, the control circuit 101 executes specific arithmetic operations by using signals input thereto from various internal units in the projector apparatus 1. The control circuit 101 outputs the arithmetic operation results as control signals to the individual units within the projector apparatus 1 so as to control a projection operation and an imaging operation executed at the projector apparatus 1. It is to be noted that the external interface (I/F) circuit 104 may be engaged in communication with an external device to modify the control program and data stored in the flash memory 101B or to store additional data into the flash memory 101B.

An image processing unit 101A in the control circuit 101 executes image processing for image data obtained via the external interface 104 or image data obtained from the memory card 150. The image processing executed at the image processing unit 101A is to be described in detail later.

The memory 102 is used as a work memory by the control circuit 101. The operation unit 103, constituted, with buttons and switches, outputs to the control circuit 101 an operation signal corresponding to a specific button or switch having been operated. Data can be written into, saved in and read out from the memory card 150 in response to instructions issued by the control circuit 101.

The projection unit 110 includes the projection optical system 111, a liquid crystal panel 112, an LED light source 113 and a projection control circuit 114. The LED light source 113 illuminates the liquid crystal panel 112 with luminance the level of which corresponds to a supplied current. At the liquid crystal panel 112, an optical image is generated in response to a drive signal provided from the projection control circuit 114. The projection optical system 111 projects the optical image output from the liquid crystal panel 112. In response to an instruction issued by the control circuit 101, the projection control circuit 114 outputs control signals to the LED light source 113 and the liquid crystal panel 112.

The projection unit 110 projects a specific image indicated by the control circuit 101. An image expressed with image data provided by an external device via the external interface circuit 104, as well as an image expressed with image data saved in the memory card 150, can be projected by the projection unit 110. The term "input image" is used in the description of the embodiment to refer to the image expressed with image data saved in the memory card 150 or the image expressed with image data provided by an external device via the external interface circuit 104.

The imaging unit 120, which includes the imaging optical system 121, an image sensor 122 and an imaging control circuit 123, captures an image of the projection surface in response to an instruction issued by the control circuit 101. The imaging optical system 121 forms a subject image on an imaging surface of the image sensor 122. The image sensor 122 converts the subject image to electrical signals. The image sensor 122 may be a CCD image sensor or a CMOS image sensor. The imaging control circuit 123 controls the drive of image sensor 122 in response to an instruction issued by the control circuit 101 and also executes specific signal processing on the electrical signals output from the image sensor 122.

Next, the input image correction processing executed in the projector apparatus 1 is described. This correction processing is executed in order to render less noticeable any pattern or stain on the projection surface, uneven illumination on the projection surface attributable to ambient light or the like, that would otherwise stand out in the projected image (projection image) as the input image is projected onto the projection surface. The control circuit 101 executes the correction processing based upon an image of the projection surface photographed via the imaging unit 120.

(Projection Processing)

Figure 3:
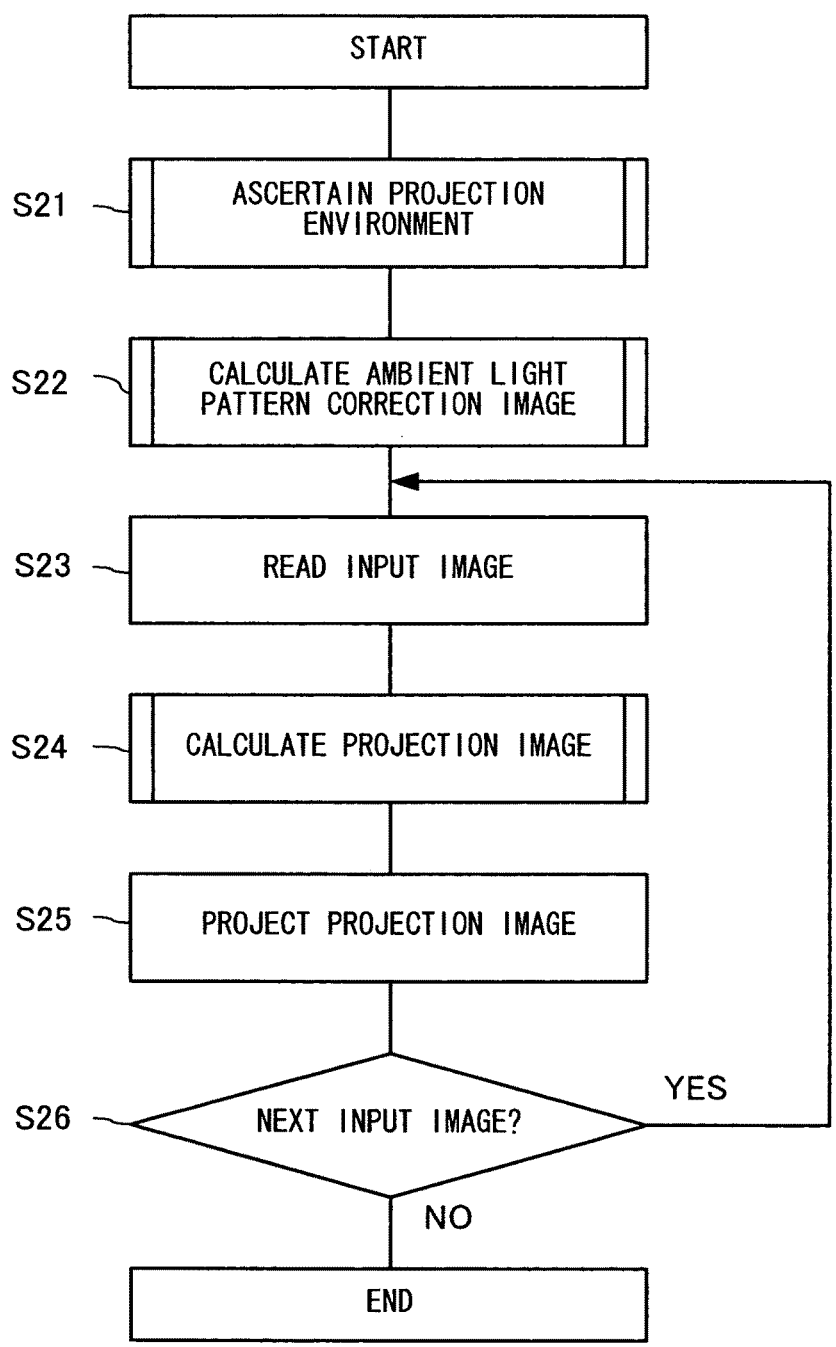
FIG. 3 presents a flowchart of projection processing.

FIG. 3 presents a flowchart of the projection processing executed by the control circuit 101. As a projection instruction is issued for the projector apparatus 1, the control circuit 101 starts up a program based upon which the processing in FIG. 3 is executed.

In step S21 in FIG. 3, the control circuit 101 analyzes the projection environment. In more specific terms, the control circuit 101 engages the imaging unit 120 in operation to capture an image of the projection surface and then obtains through calculation a density distribution image and an image indicating the reflectance distribution at the projection surface. The density distribution image indicates the presence of any pattern or stain on the projection surface and a state of any uneven illumination over the projection surface attributable to ambient light. This processing is to be described in detail later.

In step S22, the control circuit 101 obtains through calculation an ambient light pattern correction image. The ambient light pattern correction image (for instance, an image assuming a light/dark area distribution in a phase that is the inverse of the light/dark area distribution in the base pattern at the projection surface) is used to cancel out any pattern or stain present at the projection surface illuminated with the ambient light (light originating from a light source other than the projector apparatus 1) from the projection image. This processing, too, is to be described in detail later.

Figure 12:
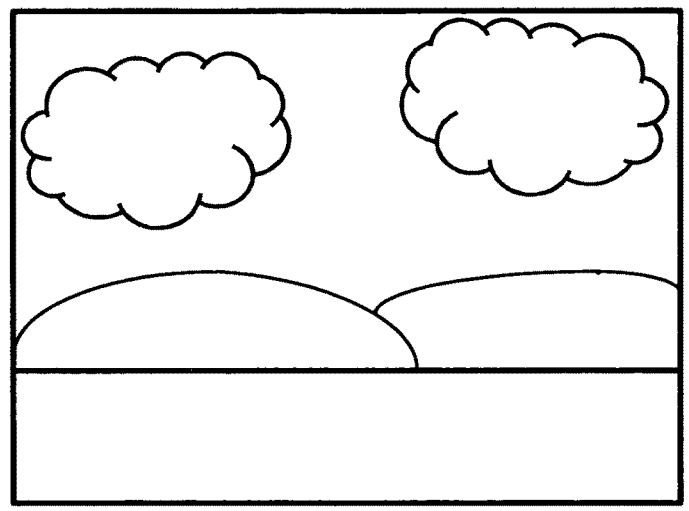
FIG. 12 is a schematic illustration presenting an example of an input image.

In step S23, the control circuit 101 reads the image data expressing an input image via the external interface circuit 104 or from the memory card 150 and stores the image data thus read into the memory 102. FIG. 12 is a schematic illustration presenting an example of an input image.

In step S24, the control circuit 101 corrects the input image and obtains through calculation a projection image. In more specific terms, the control circuit 101 first creates a correction impossible distribution image. The term "correction impossible distribution image" is used to refer to an image that indicates each area where the adverse effect attributable to a base pattern or stain present at the projection surface cannot readily be canceled out in the projection image even by projecting the image after correcting the input image in correspondence to the reflectance at the projection surface, as in the related art. The presence of such an area where the adverse effect of a base pattern or stain at the projection surface cannot readily be canceled out in the projection image is attributable to a lower level of reflectance in the particular area at the projection surface. The control circuit 101 next smooths the correction impossible distribution image and then, based upon the smoothed correction impossible distribution image and the image indicating the projection surface reflectance, it corrects the image having been read in step S23. The control circuit 101 further corrects the input image having been corrected as described above to add the adverse effects of the ambient light by adding the ambient light pattern correction image, having been obtained through calculation in step S22, to the corrected input image. It is to be noted that this processing, too, is to be described in detail later.

In step S25, the control circuit 101 executes analog conversion for the projection image having been obtained through calculation (corrected) in step S24 (i.e., the image obtained by correcting the input image) and projects via the projection unit 110 the image resulting from the conversion. In step S26, the control circuit 101 makes a decision as to whether or not there is another input image to be projected. An affirmative decision is made in step S26 if there is another input image to be projected and the operation returns to step S23 in this case. However, if there is no image to be projected, a negative decision is made in step S26 and the processing in FIG. 3 ends.

(Processing Executed to Analyze the Projection Environment)

Figure 4:
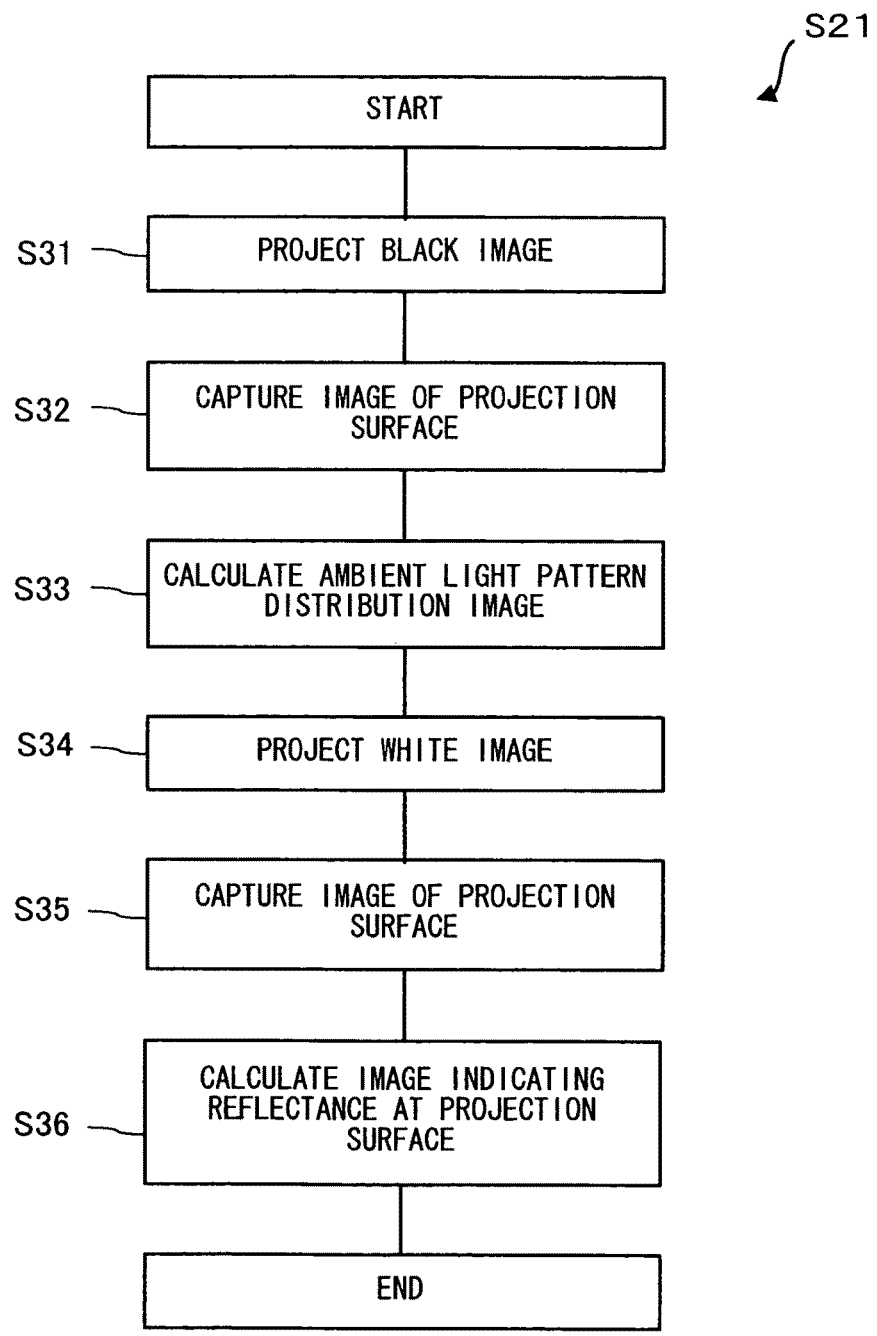
FIG. 4 presents a flowchart of processing that may be executed to analyze the projection environment.

In reference to the flowchart presented in FIG. 4, an example of processing that may be executed in step S21 (see FIG. 3) to analyze the projection environment is described in detail. The input image in the example is expressed with R data, G data and B data, each assuming an eight-bit data structure, and the volume of the data expressing the input image is equivalent to 1024 (across)×768 (down) pixels. However, the data bit length does not need to be eight bits and may be adjusted as necessary. Assuming that an image with the value at its ith pixel indicated as $(R, G, B)_i$ is projected by the projection unit 110, the pixel value taken in the photographic image at the projection surface, which corresponds to the value at the ith pixel, is indicated as $(R_P, G_P, B_P)_i$ in the following description.

In step S31 in FIG. 4, the control circuit 101 projects a black image $((R, G, B)_i=(0, 0, 0)_i)$ onto the projection surface from the projection unit 110. In step S32, the control circuit 101 engages the imaging unit 120 to capture a photographic image of the projection surface onto which the black image is projected. It is to be noted that even when a black image is projected via the projection unit 110, the output does not necessarily indicate exactly 0. In the description, such as output is referred to as an unintended output from the projection unit 110. The following explanation is provided by assuming that the ambient light mentioned earlier includes the unintended output from the projection unit 110.

Figure 13:
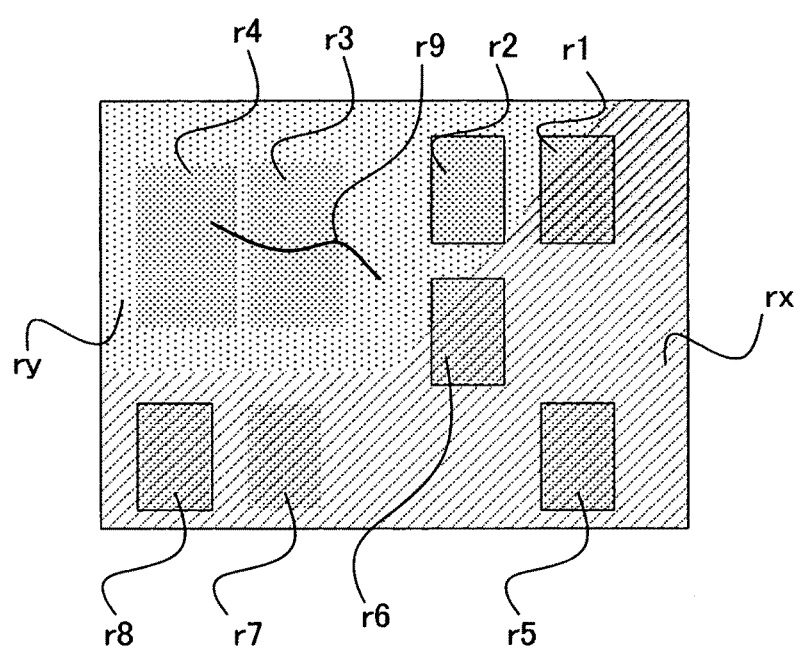
FIG. 13 is a schematic illustration presenting an example of an ambient light pattern distribution image.

In step S33, the control circuit 101 obtains through calculation an image (to be referred to as an ambient light pattern distribution image A01) by using the photographic image captured via the imaging unit 120 in step S32. Any base pattern, stain or the like present at the projection surface, illuminated with the ambient light, i.e., light originating from a light source other than the projector apparatus 1 and the unintended output from the projection unit 110, shows up in this image. In other words, the ambient light pattern distribution image A01 is equivalent to a density distribution image. The pixel value in the ambient light pattern distribution image A01 is notated as; $(R_P, G_P, B_P)_i = (R_{A01}, G_{A01}, B_{A01})_i$. FIG. 13 is a schematic illustration presenting an example of the ambient light pattern distribution image A01. FIG. 13 shows a base pattern and stains present at the projection surface illuminated with the ambient light showing up as a distribution of varying levels of density in the ambient light pattern distribution image A01. In FIG. 13, dotted areas indicated by reference numerals r1~r8 are part of the base pattern at the projection surface, whereas reference numeral r9 indicates a stain on the projection surface. In addition, a shaded area rx is an area dimly illuminated due to uneven illumination provided by the ambient light, whereas reference numeral ry indicates an area brightly illuminated due to uneven illumination provided by the ambient light. It is to be noted that the boundaries of the patterned areas r1, r2, r5, r6 and r8 are indicated with solid lines in FIG. 13 in order to simulate a condition in which the boundaries of the base pattern portions r1, r2, r5, r6 and r8 are more noticeable than the boundaries of the base pattern portions r3, r4 and r7.

In step S34, the control circuit 101 projects a white image $((R, G, B)_i=(255, 255, 255)_i)$ onto the projection surface from the projection unit 110. "255" is equivalent to the maximum value that can be indicated by the eight-bit data. In step S35, the control circuit 101 engages the imaging unit 120 in operation to capture an image of the projection surface onto which the white image is projected. The pixel value assumed in this photographic image A02 is indicated as; $(R_P, G_P, B_P)_i=(R_{A02}, G_{A02}, B_{A02})_i$. The base pattern and stains on the projection surface illuminated with the projection unit 110 and the base pattern and stains on the projection surface illuminated with light originating from a light source other than the projector apparatus 1 appear in the photographic image A02 obtained by capturing an image of the projection surface onto which the white image is projected as described above. To be more exact, the photographic image A02 contains the base pattern and stains on the projection surface illuminated with ambient light, i.e., light originating from a light source other than the projector apparatus 1 and light unintentionally output from the projection unit 110, as well as the base pattern and stains on the projection surface illuminated with the light intentionally output from the projection unit 110.

Figure 14:
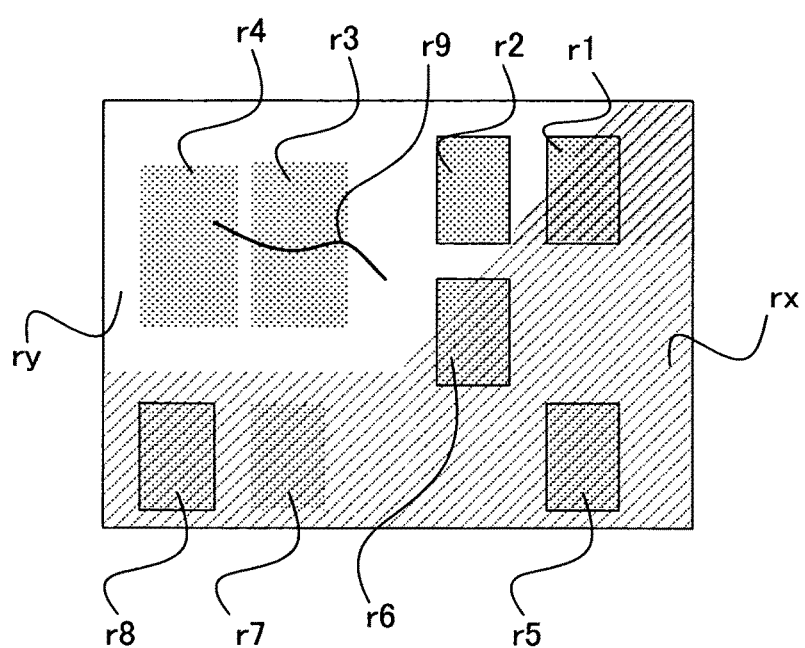
FIG. 14 is a schematic illustration presenting an example of a reflectance distribution image.

In step S36, the control circuit 101 obtains through calculation an image (to be referred to as a reflectance distribution image A03) indicating the reflectance at the projection surface by determining the difference between the photographic image A02 and the ambient light pattern distribution image A01. In more specific terms, the control circuit 101 obtains the image through calculation expressed as; $(R_{A03}, G_{A03}, B_{A03})_i=(R_{A02}-R_{A01}, G_{A02}-G_{A02}, B_{A02}-B_{A01})_i$. Thus, the reflectance distribution image A03 obtained as a result is equivalent to an image showing the base pattern and the stains on the projection surface illuminated with the light intentionally output from the projection unit 110, i.e., an image from which any influence of the ambient light illumination has been eliminated. The reflectance distribution image A03 contains the reflectance at the projection surface, and also contains the influence of any unevenness in the quantity of light output from the projection unit 110. Once the reflectance distribution image A03 is obtained through calculation, the control circuit 101 ends the processing shown in FIG. 4. FIG. 14 is a schematic illustration presenting an example of the reflectance distribution image A03. FIG. 14 shows a linear area r9 with low reflectance (e.g., a mark on the projection surface) and base pattern portions r1~r8. Through subsequent processing, various types of images, to be used for purposes of correction, are generated by using the reflectance distribution image A03 that also reflects the influence of the unevenness in the quantity of light provided from the projection unit 110, as described above, so as to also correct the adverse effect of the unevenness in the quantity of light provided by the projection unit 110 without having to execute any special processing.

(Processing Executed to Obtain Ambient Light Pattern Correction Image Through Calculation)

Figure 5:
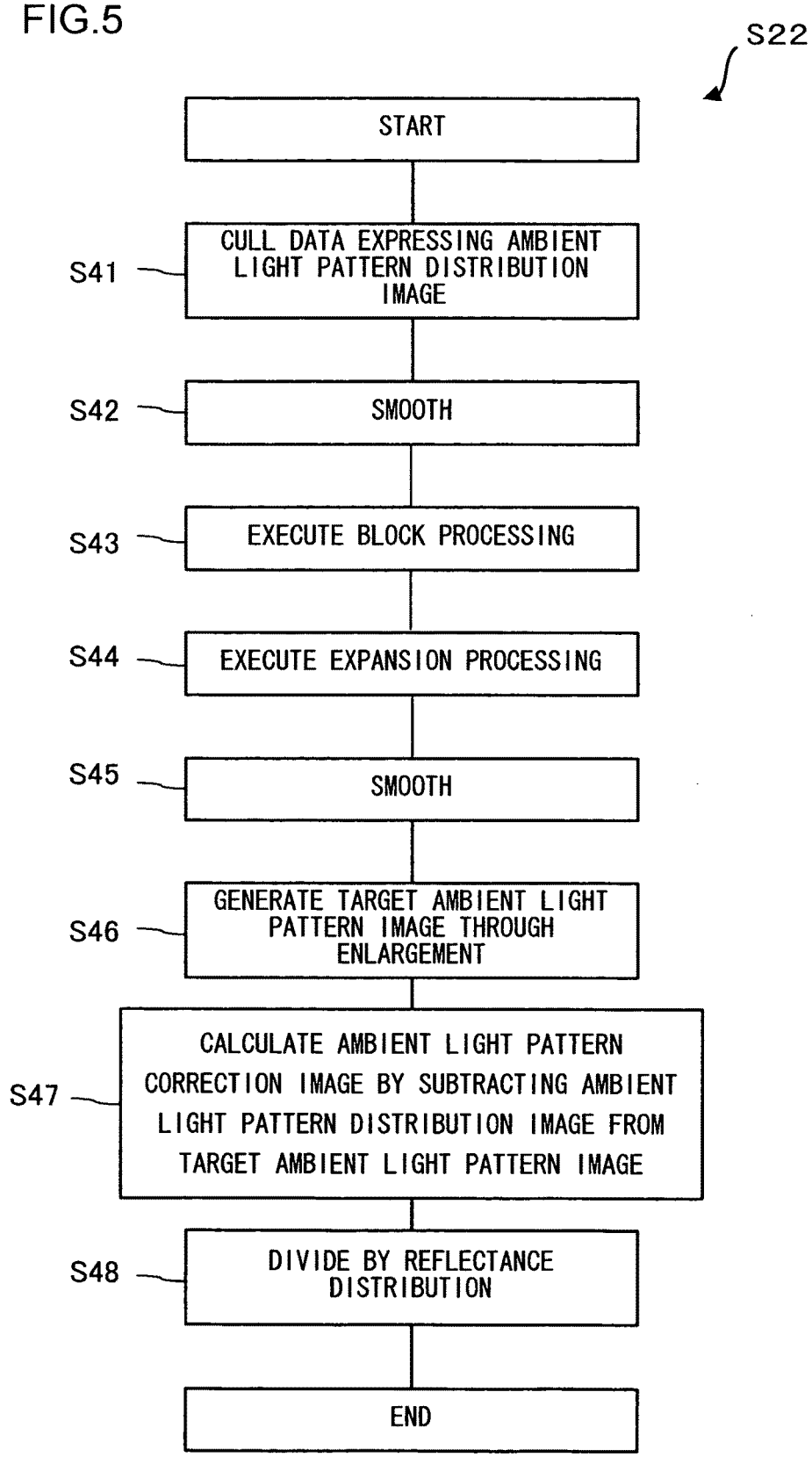
FIG. 5 presents a flowchart of processing that may be executed to determine through calculation an ambient light pattern correction image.

In reference to the flowchart presented in FIG. 5, the processing executed in step S22 (see FIG. 3) mentioned earlier to obtain through calculation the ambient light pattern correction image is described in detail.

Figure 15:
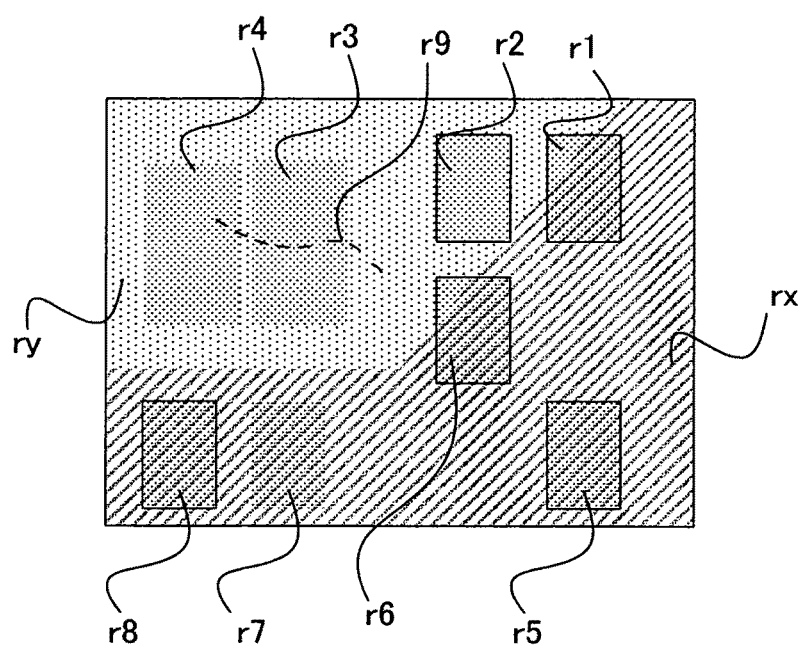
FIG. 15 is a schematic illustration presenting an example of an ambient light pattern distribution image.

In step S41 in FIG. 5, the control circuit 101 culls some of the pixels constituting the ambient light pattern distribution image A01. Assuming that the initial ambient light pattern distribution image A01 is constituted with 1024 (across)×768 (down) pixels, the control circuit 101 obtains an ambient light pattern distribution image a01 with a reduced size of 256×192 pixels by culling the data to ¼ both across and down. FIG. 15 is a schematic illustration presenting an example of the ambient light pattern distribution image a01. As in the ambient light pattern distribution image A01 in FIG. 13, the base pattern portions r1~r8 and the mark r9 at the projection surface, and the area rx dimly illuminated and the area rx brightly illuminated due to uneven illumination by ambient light all appear in the ambient light pattern distribution image a01. However, since the data have been culled to ¼ across and down, the mark r9 shows up as a disrupted line, unlike the continuous line appearing in the ambient light pattern distribution image A01. Accordingly, the mark r9 is schematically indicated as a dotted line in FIG. 15.

Figure 6:
FIG. 6 illustrates a smoothing process.
Figure 16:
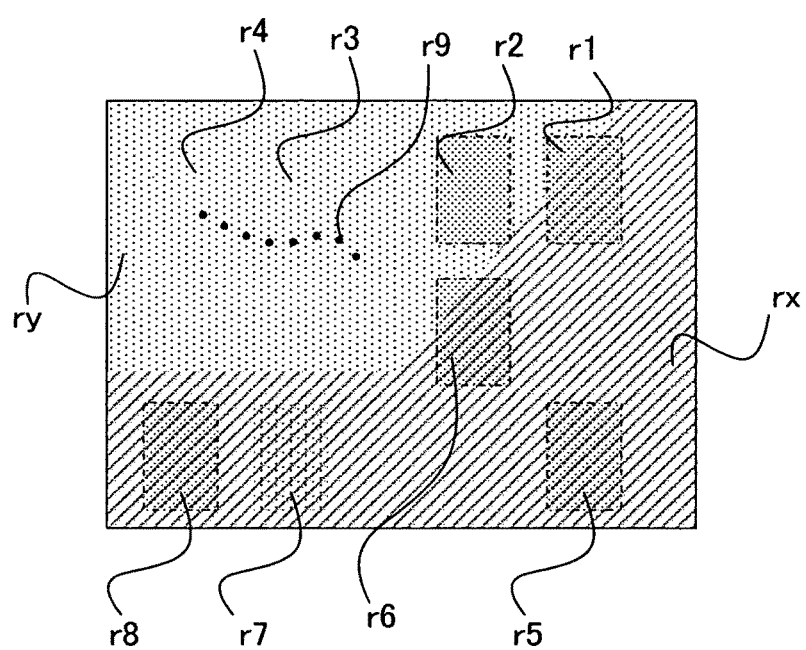
FIG. 16 is a schematic illustration presenting an example of an image that may be obtained by smoothing the ambient light pattern distribution image.

In step S42, the control circuit 101 executes low pass filter processing (e.g., moving average processing) in order to smooth the reduced ambient light pattern distribution image a01. In reference to FIG. 6, the principle of smoothing processing executed over a 3×3 kernel (a local area used for weighted averaging) is described as an example. FIG. 6 shows a target pixel assuming the central position in the group of 3×3 pixels, with an ambient light pattern distribution value of 0.3 indicated at the target pixel. It is to be noted that the term "ambient light pattern distribution value" is used to refer to the pixel value indicated at the reduced ambient light pattern distribution image a01. Pixels adjacent to the target pixel individually indicate ambient light pattern distribution values of 1.0, 0.8, 1.0, 0.6, 0.5, 0.5, 0.7 and 0.9. The control circuit 101 executes weighted averaging calculation by using the ambient light pattern distribution value at the target pixel and the ambient light pattern distribution values at the pixels adjacent to the target pixel. Namely, the control circuit 101 adds up the ambient light pattern distribution value at the target pixel and the ambient light pattern distribution values at the pixels adjacent to the target pixel with a weight of ⅑ applied thereto. The ambient light pattern distribution value calculated by the control circuit 101 for the smoothed target pixel is 0.7. FIG. 16 presents an example of an image that may be obtained by smoothing the ambient light pattern distribution image a01. Through the smoothing processing, the boundaries of the areas corresponding to the base pattern portions and the stains at the projection surface are rendered less noticeable. FIG. 16 schematically illustrates how the boundaries have become less noticeable with the boundaries of the base pattern portions r1, r2, r5, r6 and r8 indicated with a one-point chain lines and the mark r9 indicated as a dotted line.

It is to be noted that size of the kernel is allowed to assume the optimal size to assure the best appearance for the corrected input image when it is projected. For instance, the kernel may assume a 9×9 areal size or a 13×13 areal size. In addition, instead of smoothing the image through a low pass filter, the control circuit 101 may smooth the image through a median filter.

In step S43, the control circuit 101 divides the ambient light pattern distribution image having undergone the smoothing processing into blocks. In the following description, the ambient light pattern distribution image that has been smoothed is referred to as a smoothed ambient light pattern distribution image. When dividing the smoothed ambient light pattern distribution image into blocks, the control circuit 101 first partitions the smoothed ambient light pattern distribution image into specific areas. The control circuit 101 then designates the largest smoothed ambient light pattern distribution value among the smoothed ambient light pattern distribution values indicated at the pixels present in each partitioned area (each block) as a smoothed ambient light pattern distribution value representing all the pixels in the area (block). It is to be noted that the term "smoothed ambient light pattern distribution value" is used to refer to the pixel value indicated in the smoothed ambient light pattern distribution image.

Figures 7A, 7B:
FIGS. 7A and 7B illustrate a blocking process, with FIG. 7A showing the pre-blocking state in FIG. 7B showing the post-blocking state.
Figure 17:
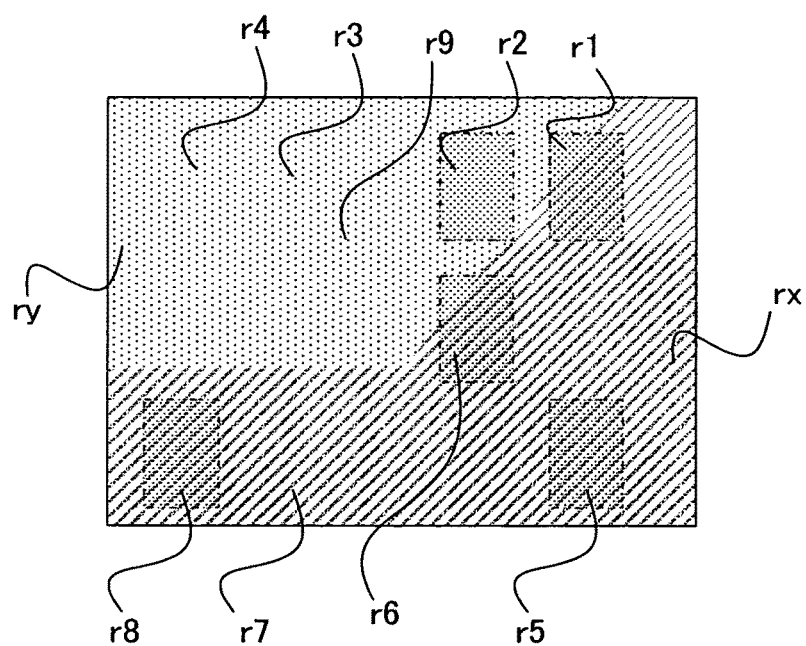
FIG. 17 is a schematic illustration presenting an example of an image that may result after the smoothed ambient light pattern distribution image undergoes the blocking process.

In reference to FIGS. 7A and 7B, an example of block processing in which a 4×4 pixel area is processed as a single block is described. As shown in FIG. 7A, the largest smoothed ambient light pattern distribution value among the pixel values indicated at the 4×4 pixels, i.e., in the particular block, is 1.0. Accordingly, all the pixels in the block having undergone the block processing assume a smoothed ambient light pattern distribution value of 1.0, as shown in FIG. 7B. Through this block processing, the size of the smoothed ambient light pattern distribution image is altered to 64×48 pixels. FIG. 17 is a schematic illustration presenting an example of an image that may be obtained by executing the block processing on the smoothed ambient light pattern distribution image. FIG. 17 indicates how the shapes of the areas in the image corresponding to the base pattern and stains on the projection surface may change and the boundaries, having been rendered less noticeable through the smoothing processing described earlier, may change as a result of the block processing. FIG. 17 schematically illustrates how the boundaries have been rendered less visible by using dots identical to the dots indicating the area ry and the base pattern portions r3, r4 and r7 and the mark r9. In addition, the boundaries of the base pattern portions r1, r2, r5, r6 and r8, having been altered from the state shown in FIG. 16, have become more noticeable. FIG. 17 schematically illustrates how the boundaries have changed by indicating the boundaries of the base pattern portions r1, r2, r5, r6 and r8 with two-point chain lines.

Figures 8A, 8B:
FIGS. 8A and 8B illustrate expansion processing, with FIG. 8A showing the state prior to execution of the expansion processing and FIG. 8B showing the state following the expansion processing.
Figure 18:
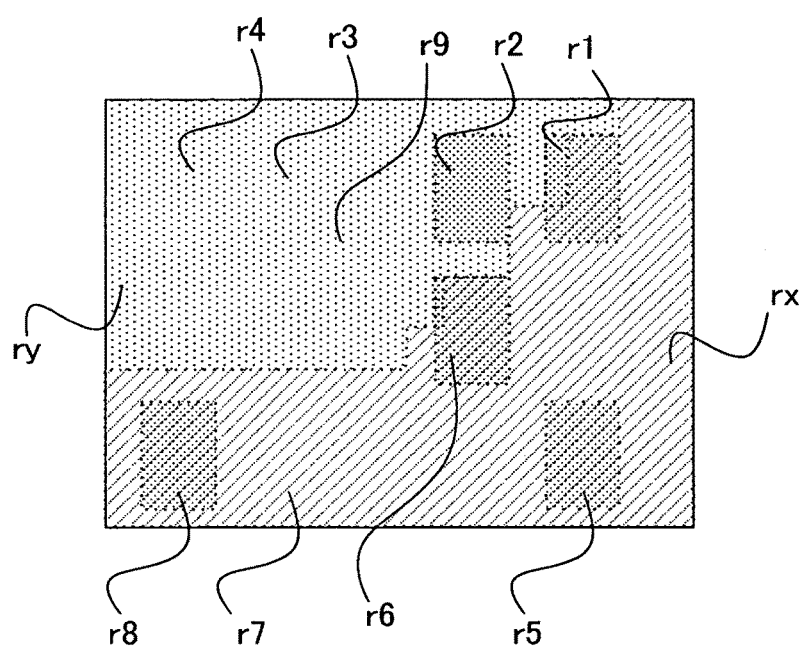
FIG. 18 is a schematic illustration presenting an example of an image that may result from the expansion processing.

In step S44, the control circuit 101 executes expansion processing on the smoothed ambient light pattern distribution image having undergone the block processing. In the expansion processing, the control circuit 101 first sets a kernel assuming a specific range centered on the target pixel in the smoothed ambient light pattern distribution image. The control circuit 101 then alters the ambient light pattern distribution values at the individual pixels present within the kernel to the largest value among the ambient light pattern distribution values indicated within the particular kernel. In reference to FIGS. 8A and 8B, an example of expansion processing that may be executed by the control circuit 101 over a 3×3 kernel range (pixel range) is described. By adjusting all the ambient light pattern distribution values within the 3×3 kernel range shown in FIG. 8A to the largest pixel value, a smoothed ambient light pattern distribution image having undergone the expansion processing, such as that shown in FIG. 8B, is obtained. The control circuit 101 in the embodiment, repeatedly executes the expansion processing twice. FIG. 18 is a schematic illustration presenting an example of an image that may result from the expansion processing. The image having undergone the expansion processing will assume wider ranges in correspondence to the largest values. FIG. 18 schematically illustrates the results of the expansion processing by using dots to indicate the boundaries of the base pattern portions r1, r2, r5, r6 and r8.

Figure 19:
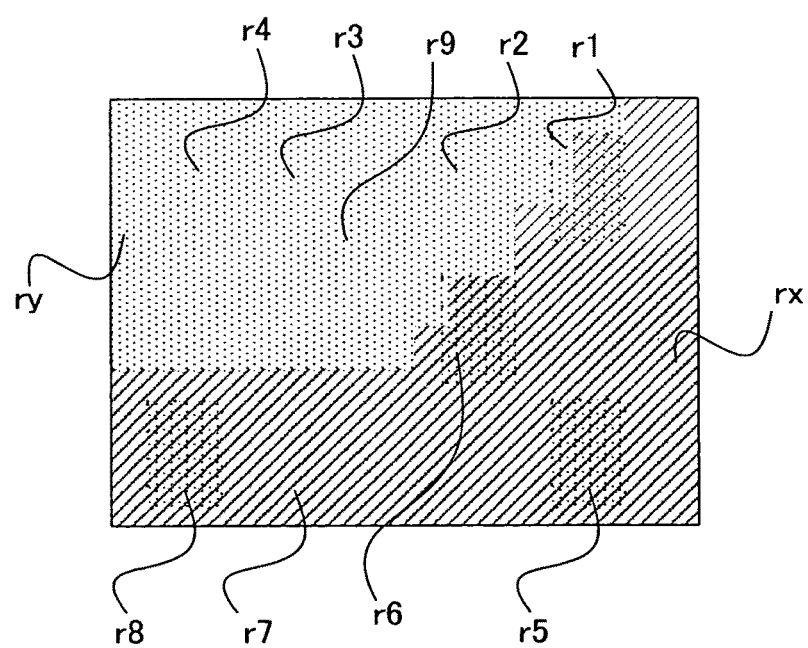
FIG. 19 is a schematic illustration presenting an example of an image that may result from re-smoothing.
Figure 20:
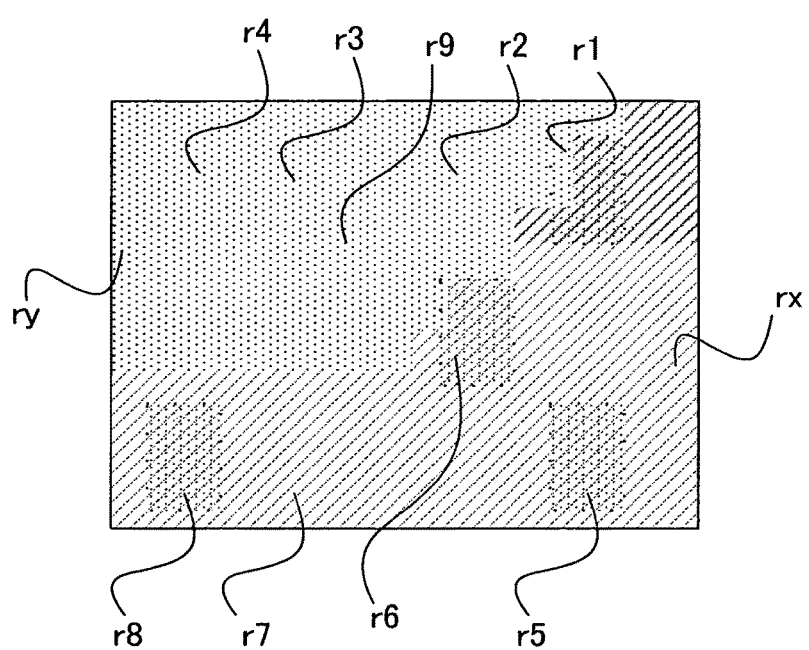
FIG. 20 is a schematic illustration presenting an example of a target ambient light pattern image.

In step S45, the control circuit 101 further smooths the smoothed ambient light pattern distribution image having undergone the expansion processing. The control circuit 101 may smooth the image through moving average processing executed over, for instance, a 9×9 kernel. FIG. 19 is a schematic illustration presenting an example of an image that may result from the further smoothing processing. Through the further smoothing processing, the boundaries of the areas corresponding to the base pattern portions on the projection surface, which have been rendered noticeable again as a result of the expansion processing, become less visible. FIG. 19 schematically illustrates how the boundaries of the base pattern portions r1, r2, r5, r6 and r8 have become less noticeable by indicating them with fewer dots than in FIG. 18. In step S46, the control circuit 101 generates a target ambient light pattern image through enlargement processing. In more specific terms, the control circuit 101 enlarges the smoothed 64×48 pixel image through a bilinear method and obtains a 1024×768 pixel image (referred to as a target ambient light pattern image E01). The target ambient light pattern image E01 thus generated is equivalent to an image obtained by extracting a low frequency component contained in the ambient light pattern distribution image A01. FIG. 20 presents an example of the target ambient light pattern image E01.

In step S47, the control circuit 101 obtains through calculation an ambient light pattern correction image D01 by subtracting the ambient light pattern distribution image A01 from the target ambient light pattern image E01. More specifically, the control circuit 101 obtains the image through calculation expressed as; $(R_{D01}, G_{D01}, B_{D01})_i = (R_{E01} - R_{A01}, G_{E01} - G_{A01}, B_{E01} - B_{A01})_i$. The resulting ambient light pattern correction image D01 is equivalent to an image obtained by extracting a high frequency component from the ambient light pattern distribution image A01. The ambient light pattern correction image D01 indicates the quantity of light required at the projection surface in order to enable the viewer to see the projection image unaffected by any adverse effects of the base pattern or stains on the projection surface. In other words, the ambient light pattern correction image D01 represents the quantity of light perceived by the viewer.

Figure 21:
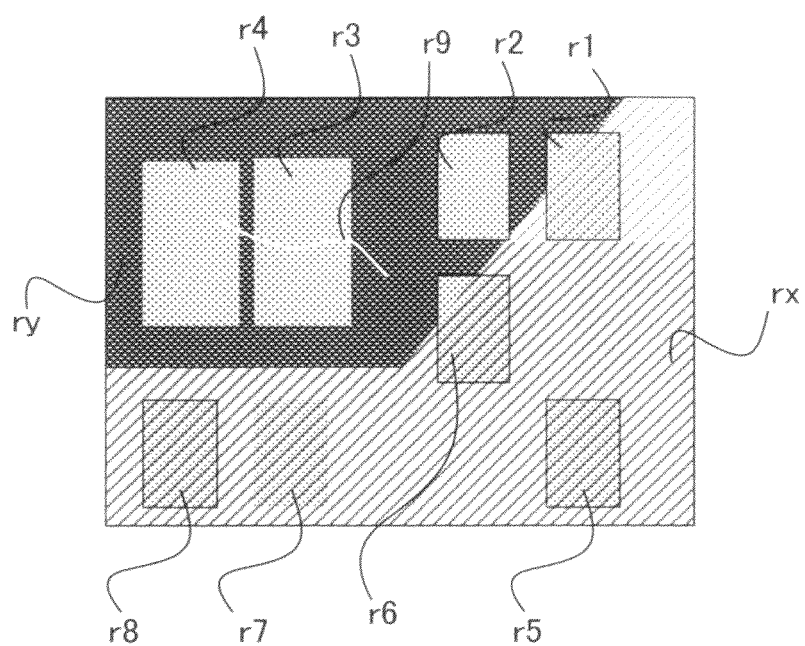
FIG. 21 is a schematic illustration presenting an example of an ambient light pattern correction image.

In step S48, the control circuit 101 obtains through calculation an ambient light pattern correction image F01 having undergone reflectance correction by dividing the ambient light pattern correction image D01 by the reflectance distribution image A03. More specifically, the control circuit 101 obtains the image through calculation expressed as $(R_{F01}, G_{F01}, B_{F01})_i = (R_{D01}/R_{A03}, G_{D01}/G_{A03}, B_{D01}/B_{A03})_i$. It then the processing in FIG. 5. FIG. 21 presents an example of the ambient light pattern correction image F01.

The ambient light pattern correction image F01 indicates the output provided from the projection unit 110, i.e., the quantity of light output from the projection unit 110 in order to project the projection image. However, since the light from the projection unit 110 is perceived by the viewer at the projection surface, where the quantity of light is altered in correspondence to the reflectance thereat, the quantity of light perceived by the viewer does not match the quantity of the output from the projection unit 110. Namely, the quantity of light perceived by the viewer matches the value obtained by multiplying the quantity of light originating from the projection unit 110 by the reflectance at the projection surface. As explained earlier, the reflectance at the projection surface is indicated by the reflectance distribution image A03, whereas the quantity of light perceived by the viewer is indicated by the ambient light pattern correction image D01. Accordingly, the control circuit 101 obtains through calculation the ambient light pattern correction image F01 indicating the quantity of light output from the projection unit 110 by dividing the ambient light pattern correction image D01 by the reflectance distribution image A03.

(Projection Image Generation Processing)

Figure 9:
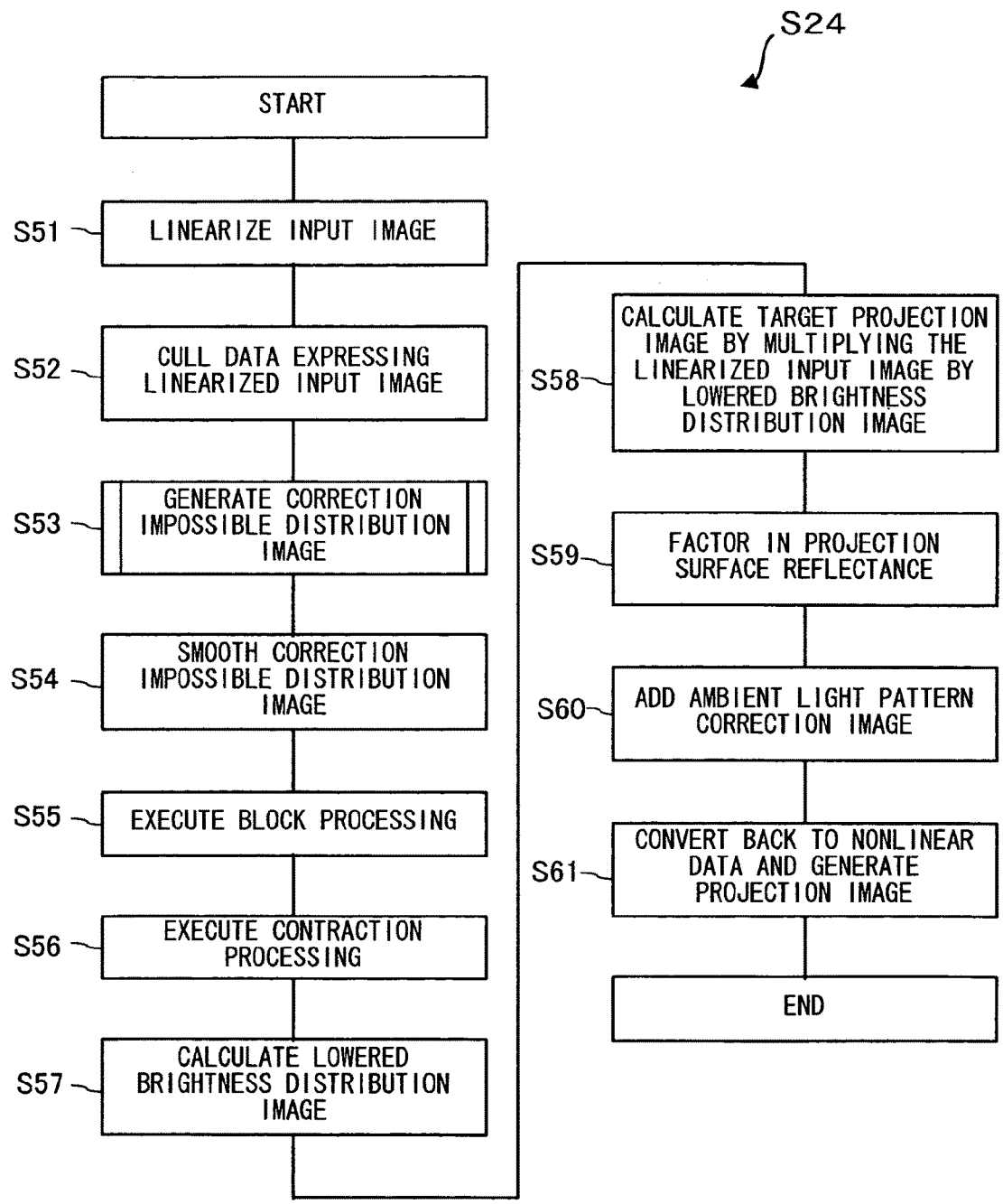
FIG. 9 presents a flowchart of processing that may be executed to generate a projection image.

In reference to the flowchart presented in FIG. 9, an example of processing that may be executed in step S24 (see FIG. 3) to generate the projection image is described in detail.

In step S51 in FIG. 9 the control circuit 101 obtains an image (referred to as a linearized image C01) by individually linearizing the pixel values indicated in the input image (1024×768 pixels). The control circuit 101 obtains the linearized values through inverse γ conversion sequentially executed for the individual pixels by referencing, for instance, a lookup table (LUT). Such an LUT should assume a sufficient bit length so that any potential loss of gradation through the calculation operation can be prevented, by taking into consideration the input/output characteristics (including the white level enhancement characteristics to be detailed later) indicating the relationship between the input image input to the projection unit 110 and the output image projected from the projection unit 110. The LUT in the example assumes a 10-bit length (may assume a 12-bit length). The LUT is stored within the flash memory 101B.

In step S52, the control circuit 101 culls some of the pixels constituting the linearized image C01. Namely, the control circuit 101 obtains a linearized image c01 with a reduced size of 256×192 pixels by culling the data to ¼ the initial pixel size (1024×768) both across and down.

In step S53, the control circuit 101 creates a correction impossible distribution image B03, and then the operation proceeds to step S54. The processing executed to create the correction impossible distribution image B03 is to be described in detail later. It is to be noted that the correction impossible distribution image B03 is an image indicating the distribution of areas where the base pattern or stains on the projection surface cannot be canceled out of the projection image due to low reflectance at the projection surface, as explained earlier.

Figure 22:
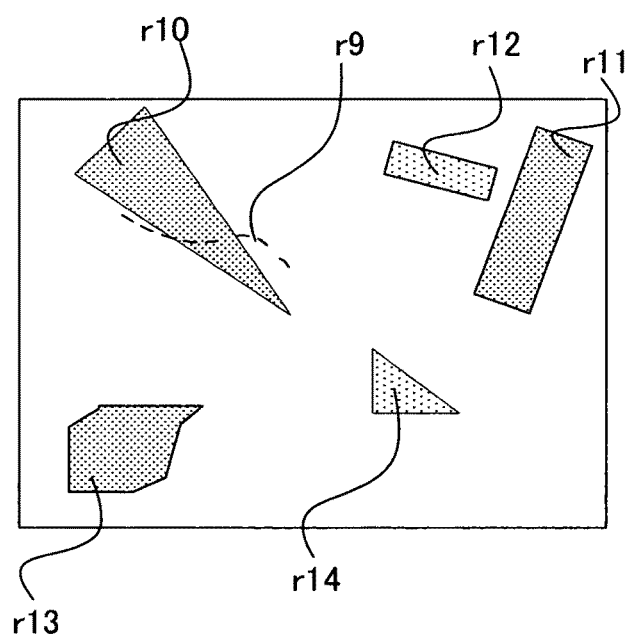
FIG. 22 is a schematic illustration presenting an example of a correction impossible distribution image.

In step S54, the control circuit 101 culls some of the pixels constituting the correction impossible distribution image B03 to ¼ of the current size both across and down so as to obtain a correction impossible distribution image b03 with a reduced size of 256×192 pixels and then smooths the correction impossible distribution image b03. FIG. 22 presents an example of the correction impossible distribution image b03. Reference numerals r9~r14 in FIG. 22 each indicate an area that cannot be corrected without lowering the brightness. The correction impossible distribution image b03 assumes a darker shade over an area with a higher level of difficulty for correction. FIG. 22 assumes a higher level of dot density in the areas r9~r14 to indicate a higher level of correction difficulty. Namely, the level of correction difficulty is higher in the areas r10~r13 in FIG. 22.

Figure 23:
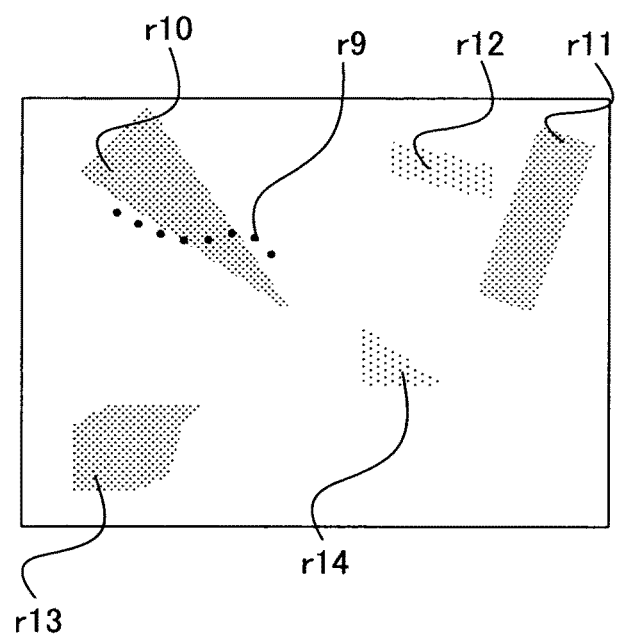
FIG. 23 is a schematic illustration presenting an example of a smoothed correction impossible distribution image.

FIG. 23 is a schematic illustration presenting an example of a correction impossible distribution image having undergone smoothing processing. It is to be noted that the control circuit 101 smooths the image through moving average processing executed over, for instance, a 3×3 kernel. FIG. 23 schematically illustrates how the boundaries of the areas r10~r14, which cannot be corrected without lowering the brightness, have become less noticeable. In addition, the area r9 indicated as a line in FIG. 22 is represented with dots in FIG. 23 to indicate that it has been smoothed.

Figure 24:
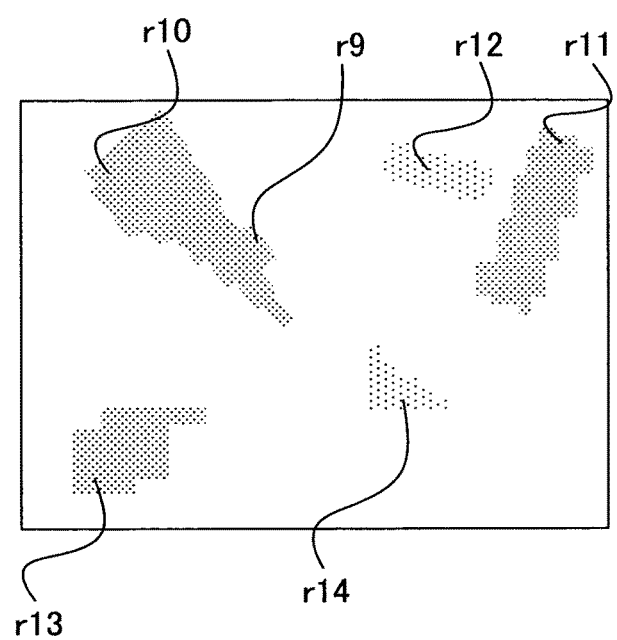
FIG. 24 is a schematic illustration presenting an example of a correction impossible distribution image having undergone the blocking process.

In step S55, the control circuit 101 divides the smoothed correction impossible distribution image into blocks. Assuming that the smoothed correction impossible distribution image is divided into blocks each made up with 4×4 pixels, the control circuit 101 designates the largest pixel value among the pixel values indicated at the pixels contained in each block as a correction impossible distribution value for the entire block in the block processing. Through the block processing, the correction impossible distribution pixel is converted to an image constituted with 64×48 pixels. FIG. 24 is a schematic illustration presenting an example of a correction impossible distribution image that may result from the block processing. FIG. 24 schematically illustrates how the shapes of the areas r9~r14 have been altered through the block processing. In addition, FIG. 24 indicates that the alterations in the shapes of the individual areas r9~r14 attributable to the block processing have resulted in the areas r9 and r10 joining each other to form a substantially single area.

Figures 10A, 10B:
FIGS. 10A and 10B illustrate the contraction processing, with FIG. 10A showing the state prior to execution of the contraction processing and FIG. 10B showing the state following the contraction processing.
Figure 25:
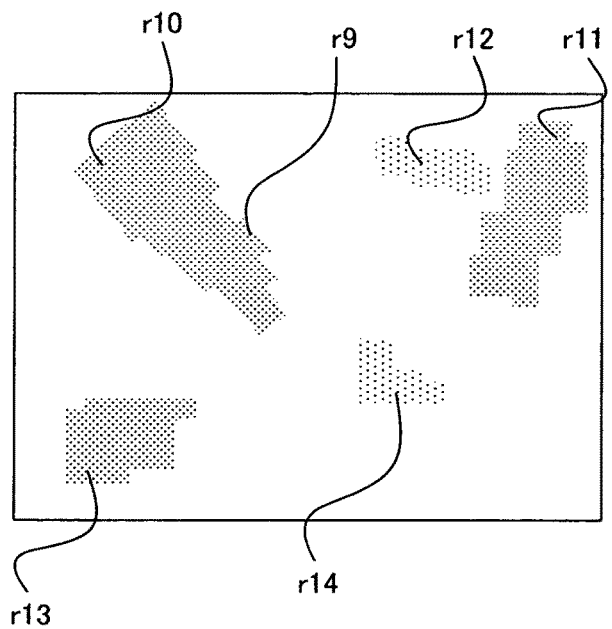
FIG. 25 is a schematic illustration presenting an example of a correction impossible distribution image having undergone the contraction processing.

In step S56, the control circuit 101 executes contraction processing on the correction impossible distribution image having undergone the block processing. In the contraction processing, the control circuit 101 first sets a kernel assuming a specific range centered on the target pixel in the correction impossible distribution image having undergone the block processing. Next, the circuit 101 designates the smallest value among the pixel values indicated at the pixels in the kernel as a correction impossible distribution value for the entire kernel. In reference to FIGS. 10A and 10B, an example of contraction processing that may be executed by the control circuit 101 over a 3×3 kernel range (pixel range) is described. By adjusting all the pixel values within the 3×3 kernel range shown in FIG. 10A to the smallest value, a correction impossible distribution image having undergone the contraction processing, such as that shown in FIG. 10B, is obtained. The control circuit 101 in the embodiment repeatedly executes the contraction processing twice. FIG. 25 is a schematic illustration presenting an example of an image that may result from the contraction processing. The correction impossible distribution image having undergone the contraction processing will assume wider ranges in correspondence to the smallest values. FIG. 25 schematically illustrates the results of the contraction processing by indicating the areas r9~r14 in shapes altered from those of the areas r9~r14 in FIG. 24.

Figure 26:
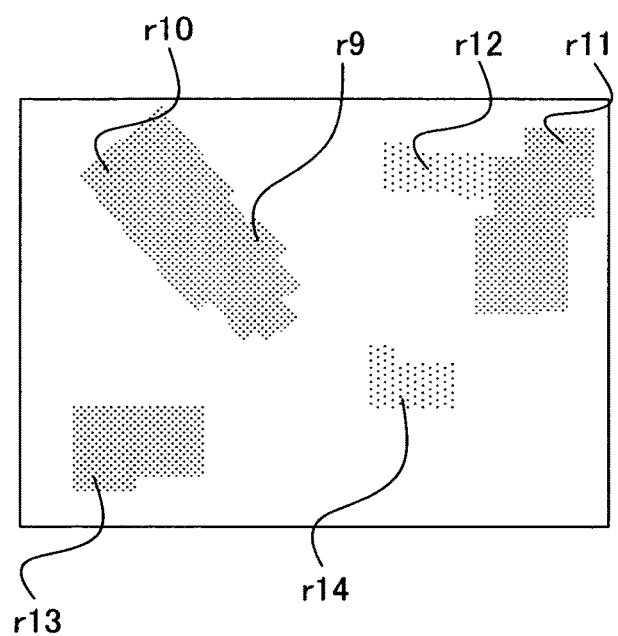
FIG. 26 is a schematic illustration presenting an example of a re-smoothed correction impossible distribution image.

In step S57, the control circuit 101 obtains a lowered brightness distribution image by further executing smoothing processing and enlargement processing on the correction impossible distribution image having undergone the contraction processing. The control circuit 101 smooths the image through moving average processing executed over, for instance, a 9×9 kernel. FIG. 26 is a schematic illustration presenting an example of a correction impossible distribution image that may result from the further smoothing processing. Through the further smoothing processing, the boundaries of the areas r9~r14 in the image, which have been rendered noticeable again as a result of the block processing, become less visible. FIG. 26 schematically illustrates the results of the contraction processing by showing the areas r9~r14 in shapes altered from those of the areas r9~r14 in FIG. 25.

Figure 27:
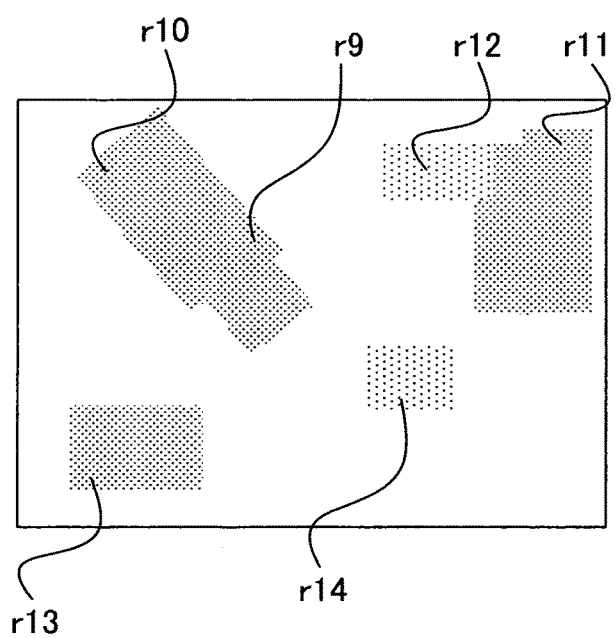
FIG. 27 is a schematic illustration presenting an example of a lowered brightness distribution image.

In the enlargement processing, the control circuit 101 enlarges the further smoothed 64×48 pixel image through a bilinear method and obtains a 1024×768 pixel image (referred to as a lowered brightness distribution image H01). The lowered brightness distribution image H01 thus generated is equivalent to an image obtained by extracting a low frequency component contained in the correction impossible distribution image B03. FIG. 27 presents an example of the lowered brightness distribution image H01. FIG. 27 schematically illustrates the results of the enlargement processing by showing the areas r9~r14 in shapes altered from those of the areas r9~r14 in FIG. 26. The lowered brightness distribution image H01 indicates the distribution of areas assuming non-uniform low brightness levels on the projection surface (i.e., the base pattern and stains).

Figure 28:
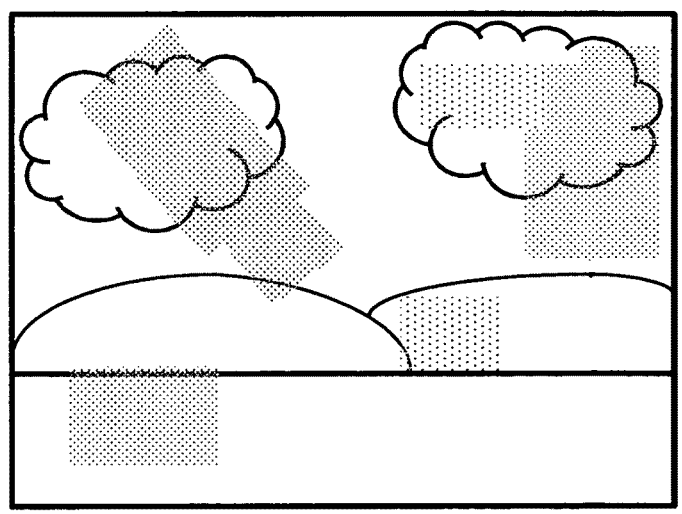
FIG. 28 is a schematic illustration presenting an example of a target projection image.

In step S58, the control circuit 101 obtains through calculation a target projection image J01 by multiplying the linearized image C01 by the lowered brightness distribution image H01 and then the operation proceeds to step S59. FIG. 28 is a schematic illustration presenting an example of the target projection image J01. FIG. 28 schematically illustrates the target projection image J01 by superimposing the lowered brightness distribution image H01 in FIG. 27 over the linearized image C01.

The projection image seen by the viewer is an image perceived as the projection image output from the projection unit 110, which is affected to an extent corresponding to the reflectance at the projection surface, i.e., an image obtained by multiplying the projection image output from the projection unit by the reflectance distribution image A03. Provided that the linearized image C01 is reproduced exactly as is on the projection surface, the projected image can be viewed as a projection image unaffected by the base pattern, stains and the like on the projection surface. In other words, only if the linearized image C01 exactly matches the image obtained by multiplying an image (corrected image) resulting from a specific correction of the linearized image C01 by the reflectance, a projection image can be viewed free from any adverse effects of the base pattern, stains and the like on the projection surface. This means that the correction image can be generated by dividing the linearized image C01 by the reflectance distribution image A03. The correction image thus obtained is the projection image that should be output from the projection unit 110 in order to cancel out the appearance of the adverse effects of the base pattern, stains and the like on the projection surface. The correction image indicates that an area corresponding to an area with low reflectance on the projection surface (an area greatly affected by the base pattern, a stain or the like) is projected with a higher level of brightness (high brightness) in correspondence to the lower reflectance.

However, if the input image (or the linearized image C01) assumes large pixel values or if the reflectance at the projection surface is low, the pixel values in the correction image may exceed the level of the maximum output at the projection unit 110. In such a case, the control circuit 101 should lower the brightness of the linearized image C01 so as to ensure that the base pattern and stains on the projection surface, which would otherwise be visible in the projection image, can be corrected at the maximum output level of the projection unit 110. At this time, in order to ensure that the entire area (including areas less affected by the base pattern or stains) of the linearized image will not be unnecessarily darkened as the brightness of the linearized image C01 is uniformly lowered, the control circuit 101 multiplies the linearized image C01 by the lowered brightness distribution image H01. The target projection image J01 is thus generated by adjusting the luminance (brightness) of areas in the linearized image C01, which correspond to areas greatly affected by the base pattern, stains and the like on the projection surface, to a low level. This target projection image J01 is the projection image seen by the viewer, which is not affected by the base pattern, stains and the like on the projection surface.

In step S59, the control circuit 101 obtains through calculation a target projection image K01 resulting from reflectance correction by dividing the target projection image J01 by the reflectance distribution image A03 and then the operation proceeds to step S60. More specifically, the control circuit 101 obtains the image through calculation expressed as; $(R_{K01}, G_{K01}, B_{K01})_i = (R_{J01}/R_{A03}, G_{J01}/G_{A03}, B_{J01}/B_{A03})_i$.

The target projection image K01 represents the projection image to be output by the projection unit 110. However, since the projection image output from the projection unit 110 is altered in correspondence to the reflectance at the projection surface as seen by the viewer, the projection image output from the projection unit 110 is not exactly the same as the projection image seen by the viewer. Namely, the projection image seen by the viewer is equivalent to the product obtained by multiplying the projection image output from the projection unit 110 by the reflectance at the projection surface. As explained earlier, the reflectance at the projection surface is indicated in the reflectance distribution image A03 and the image seen by the viewer is the target projection image J01. Accordingly, the control circuit 101 obtains through calculation the target projection image K01, i.e. the projection image to be output from the projection unit 110, by dividing the target projection image J01 by the reflectance distribution image A03.

Figure 29:
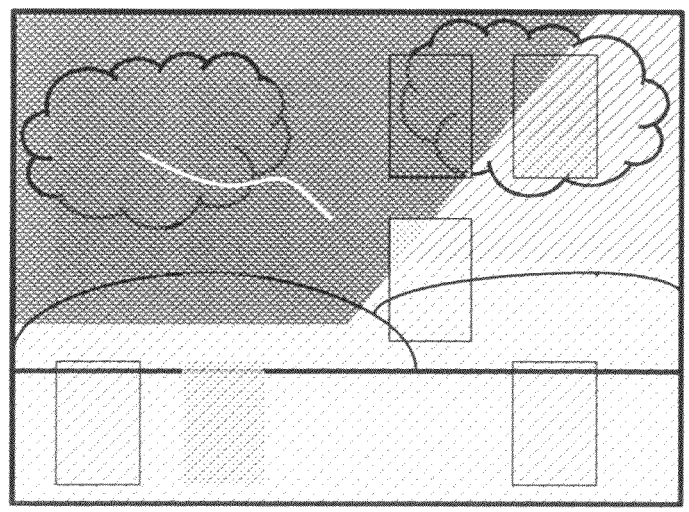
FIG. 29 is a schematic illustration presenting an example of a projection image.

In step S60, the control circuit 101 obtains through calculation a projection image L01 by adding the ambient light pattern correction image F01 to the target projection image K01 resulting from the reflectance correction and then the operation proceeds to step S61. In more specific terms, the control circuit 101 obtains the image through calculation expressed as; $(R_{L01}, G_{L01}, B_{L01})_i = (R_{K01}+R_{F01}, G_{K01}+G_{F01}, B_{K01}+B_{F01})_i$. FIG. 29 is a schematic illustration presenting an example of the projection image L01.

In step S61, the control circuit 101 obtains the actual projection image L01 converted back to the nonlinear data format through γ conversion executed on the projection image L01. The γ conversion should be executed by using an LUT stored in the flash memory 101B.

(Correction Impossible Distribution Image Generation Processing)

Figure 11:
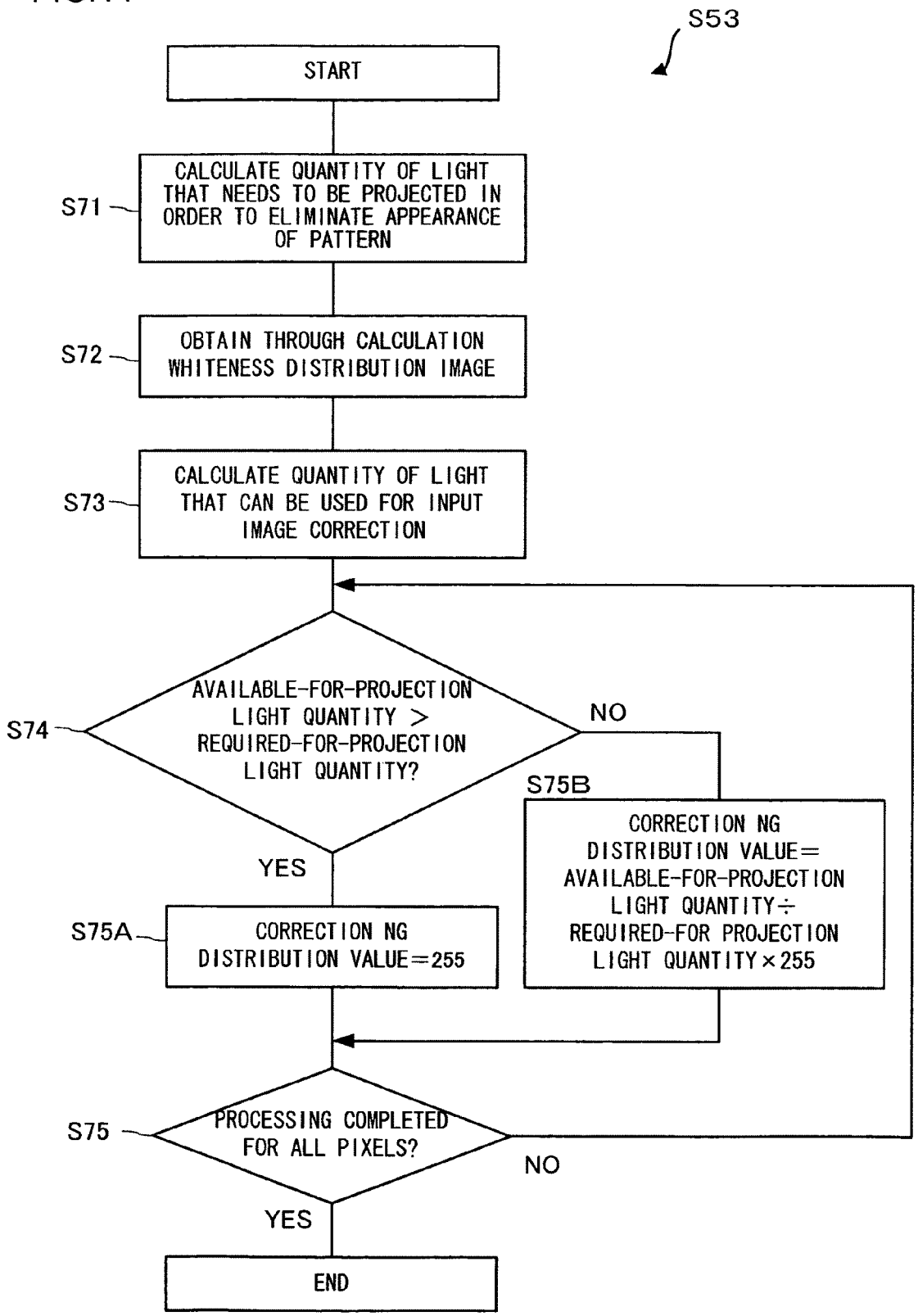
FIG. 11 presents a flowchart of processing that may be executed to generate a correction impossible distribution image.

In reference to the flowchart, presented in FIG. 11, processing that may be executed in step S53 (see FIG. 9) in order to generate the correction impossible distribution image B03, is explained in detail. In step S71 in FIG. 11, the control circuit 101 calculates the quantity of light that must be output in order to eliminate (cancel) the appearance of any pattern present on the projection surface. In more specific terms, the control circuit 101 calculates $(R_{N1}, G_{N1}, B_{N1})_i = (R_{C01}/R_{A03}, G_{C01}/G_{A03}, B_{C01}/B_{A03})_i$ by dividing the linearized image C01 by the reflectance distribution image A03.

In step S72, the control circuit 101 obtains through calculation a whiteness distribution image, and then the operation proceeds to step S73. It is assumed that the whiteness is represented in the embodiment by the extent to which the white level is enhanced so as to increase the visually perceived brightness of the projection image projected via the projection unit 110. The control circuit 101 may achieve white level enhancement by controlling some of the pixels at the liquid crystal panel 112 so that they assume a white color.

Figure 30:
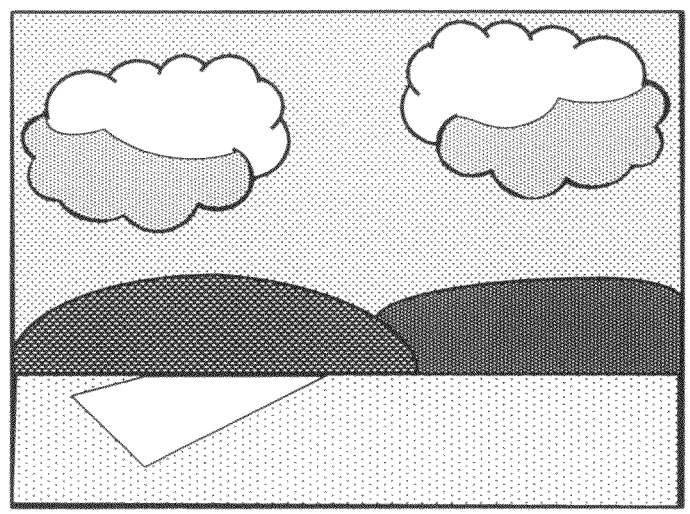
FIG. 30 presents an example of a whiteness distribution image.

Assuming that the extent of crosstalk occurring among the R, G and B pixels is negligible, and that the white level is enhanced in correspondence to the least pixel value among the input pixel values R, G and B, the whiteness $W_γ$ can be expressed as; $W_γ = 1 + a \times R$ when $R < G < B$. The constant "a" indicates the extent to which the white level is enhanced. FIG. 30 presents an example of a whiteness distribution image that may be obtained through the calculation executed in step S72. It is to be noted that in the schematic illustration presented in FIG. 30 the white level is lower in a more densely dotted area.

In step S73, the control circuit 101 calculates the output from the projection unit 110 (the quantity of light output from the projection unit 110) that can be used to correct the input image. Namely, the control circuit 101 calculates $(R_{M1}, G_{M1}, B_{M1})_i = (255 \times W_\gamma - R_{F01}, 255 \times W_\gamma - G_{F01}, 255 \times B_{F01})_i$ by subtracting the pixel value assumed in the ambient light pattern correction image F01 from the product of 255, the maximum output value that can be taken in 8-bit data output from the projection unit 110, multiplied by the white level $W_\gamma$.

In step S74, the control circuit 101 executes pixel-by-pixel comparison of the quantity of light that can be projected and the quantity of light needed for projection. The control circuit 101 makes an affirmative decision in step S74 if "quantity of light that can be projected">"quantity of light needed for projection", i.e., if $(R_{M1}, G_{M1}, B_{M1})_i > (R_{N1}, G_{N1}, B_{N1})_i$ is true, and in this case, the operation proceeds to step S75A. However, if "quantity of light that can be projected">"quantity of light needed for projection" is not true, i.e., if $(R_{M1}, G_{M1}, B_{M1})_i > (R_{N1}, G_{N1}, B_{N1})_i$ is not true, a negative decision is made in step S74 and the operation proceeds to step S75B.

In step S75A, the control circuit 101 sets the correction impossible distribution value so that $(R_{B01}, G_{B01}, B_{B01})_i = (255, 255, 255)$ before proceeding to step S76. In step S75B, the control circuit 101 sets the correction impossible distribution value so that $(R_{B01}, G_{B01}, B_{B01})_i + (R_{M1}/R_{N1}, G_{M1}/G_{N1}, B_{M1}/B_{N1})_i \times 255$ before proceeding to step S76.

In step S76, the control circuit 101 makes a decision as to whether or not the comparison in step S74 has been executed for all the pixels in the input image. An affirmative decision is made in step S76 if the comparison in step S74 has been completed for all the pixels expressing the input image, and in this case, the correction impossible distribution calculation processing executed as shown in FIG. 11 ends. However, if the comparison in step S74 has not been executed for all the pixels in the input image, a negative decision is made in step S76 and the operation returns to step S74.

Figure 31:
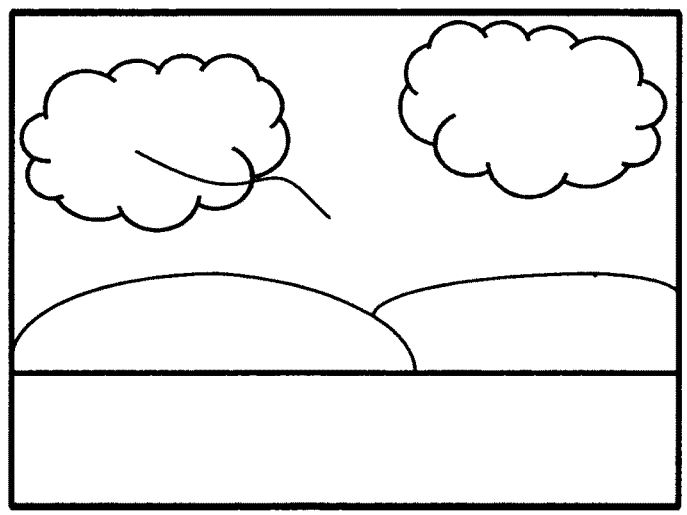
FIG. 31 is a schematic illustration presenting an example of a corrected projection image that is projected onto a projection surface.
Figure 32:
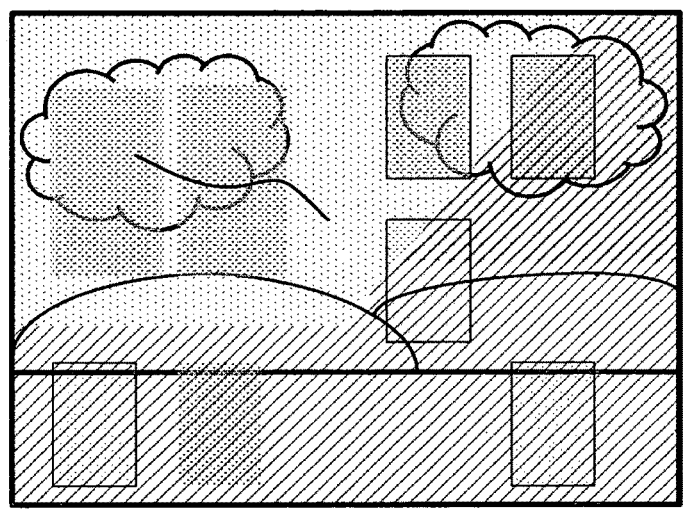
FIG. 32 is a schematic illustration presenting an example of a projection image projected onto a projection surface without correction.

FIG. 31 presents an example of a projection image that may be projected onto the projection surface after undergoing the correction executed in the projector apparatus 1, as described above. The appearance of the pattern at the projection surface is rendered less noticeable in the projection image. FIG. 32 presents, for purposes of comparison, an example in which the input image is directly projected onto the projection surface as a projection image, without undergoing the correction described above. Unlike in the image shown in FIG. 31, the base pattern at the projection surface is clearly visible in the projection image in FIG. 32.

The following advantages are achieved through the first embodiment described above.

(1) The projector apparatus 1 includes a projection unit 110 that projects an image onto the projection surface, a memory card I/F 105 from which image data are input and a control circuit 101. The control circuit 101 detects a reflectance distribution A03 at the projection surface, detects an ambient light pattern distribution image A01 at the projection surface and smooths both the reflectance distribution A03 and the ambient light pattern distribution image A01. Based upon the smoothed reflectance distribution, the smoothed ambient light pattern distribution image and the input/output characteristics of the projection unit 110, the control circuit 101 corrects the image data C01 having been input and controls the projection unit 110 so that it projects an image based upon the corrected image data. As a result, the input image can be corrected so as to cancel out the appearance of any color stains or base pattern at the projection surface without greatly compromising the quality of the projection image. Through the smoothing processing, the image data can be corrected in such a manner that corrected areas do not become conspicuous.

In addition, since the input image data C01 are corrected by factoring in the input/output characteristics of the projection unit 110 as well, effective image data correction is achieved when the white level is enhanced in order to increase the appearance of brightness in the projection image projected via the projection unit 110. More specifically, while the "addition rule" does not normally apply to the input/output characteristics of the projection unit 110 when the white level is enhanced, the appearance of a base pattern and the like may not be fully canceled out simply by correcting the input image data C01 based upon the smoothed reflectance distribution and the smoothed ambient light pattern distribution image alone unless the addition rule is applicable. The white level is usually enhanced for image data projected with a small amount of light provided from a light source, e.g. image data projected via a compact projector apparatus driven with a battery.

(2) The control circuit 101 alters the data size of the ambient light pattern distribution image A01 to a size smaller than the data size of the image that the projection unit 110 projects. Then, based upon the reflectance distribution and the ambient light pattern distribution image with the altered data size, the control circuit 101 obtains through calculation correction information (ambient light pattern correction image) to be used to cancel out the appearance of the projection surface base pattern from the projection image. Through these measures, the onus of the calculation processing can be lessened compared to that of the calculation executed without altering the data size and consequently, the processing can be completed over a shorter period of time.

(3) The control circuit 101 generates a lowered brightness distribution image H01, indicating a cancellation possible/impossible distribution, based upon the correction information (ambient light pattern correction image) F01, the input image data C01, the reflectance distribution A03 and the extent to which the brightness is enhanced at the projection unit 110. The control circuit 101 individually converts the data expressing the lowered brightness distribution image H01 and the input image data C01 so that they each assume a size smaller than the data size of the image to be projected by the projection unit 110. The control circuit 11 then corrects the input image data C01 by using the lowered brightness distribution image having undergone the size conversion, the input image having undergone the size conversion, the reflectance distribution and the correction information (ambient light pattern correction image). As a result, the onus of the calculation processing is lightened compared to that of the calculation processing that would have to be executed in conjunction with data in the initial data sizes, and thus, the processing can be completed in less time.

(4) The control circuit 101 obtains through calculation correction information (ambient light pattern correction image) based upon the density distribution having undergone the size alteration, in correspondence to each of specific areas defined on the projection image plane. Thus, the projection image can be corrected in units of individual pixels by setting the specific areas each in correspondence to a pixel so as to obtain the correction information for the particular pixel.

(5) The control circuit 101 executes the arithmetic operation necessary for correction based upon the lowered brightness distribution image having undergone the size alteration, in correspondence to each of specific areas defined on the projection image plane. Thus, the projection image can be corrected in units of individual pixels by executing the arithmetic operation for each of the pixels set as the specific areas.

Second Embodiment

Next, the projector apparatus 1 achieved in the second embodiment of the present invention is described. The following explanation focuses on features differentiating the embodiment from the first embodiment by assigning the same reference numerals to components identical to those in the first embodiment. Aspects of the second embodiment that are not specially noted are identical to those of the first embodiment. The projection image generation processing and the correction impossible distribution image generation processing executed in the embodiment are different from those executed in the first embodiment.

The projector apparatus 1 in the second embodiment executes the projection image generation processing by using a lookup table (LUT) that is different from the LUT used in the projector apparatus 1 in the first embodiment. The following is a detailed description of the LUT.

The LUT is used when executing an inverse γ conversion to convert the input image data made up of 8-bit R, G and B data to output image data made up of 8-bit R, G and B data, which correspond to specific gradation characteristics (e.g., γ=2.2). Generally, the pixels at the liquid crystal panel 112 of the projection unit 110 may include pixels representing a component other than the R color component, the color component G or the B color component (pixels at which color filters corresponding to the R component, the component G or the B component are not disposed) with a predetermined pixel ratio. The light originating from the LED light source 113 is directly output in an unfiltered state via the pixels representing the component other than the R, G and B color components, instead of the R color light output by the pixels equipped with the R color filters, the G color light output via the pixels equipped with the G color filters or the B color light output via the pixels equipped with the B color filters. Since light that is not filtered through any color filter is substantially constituted with a white color component, the "whiteness" is enhanced and the projection image is visually perceived to be brighter.

With the LUT used in the embodiment, inverse γ conversion similar to that executed in conjunction with a liquid crystal panel without any brightness-enhancing pixels is executed even when the liquid crystal panel 112 at the projection unit 110 includes pixels used for purposes of brightness enhancement, as described above. In other words, regardless of whether or not the pixels at the liquid crystal panel 112 of the projection unit 110 include pixels representing a component other than the R color component, the G color component or the B color component, inverse γ conversion is executed exclusively on the signals representing the R, G and B color components. It is to be noted that the LUT in the embodiment is configured by assuming a 10-bit length (or a 12-bit length), i.e., greater than the 8-bit length of the gradation data, in order to prevent any gradation loss during the calculation processing. The LUT is stored in the flash memory 101B.

The control circuit 101 generates the linearized image C01 by using the LUT described above in the processing executed in step S51 in the flowchart presented in FIG. 9. Subsequently, the control circuit 101 obtains the actual projection image L02 expressed with data reconverted to the nonlinear format, by executing γ conversion on the projection image L01 in step S61 in FIG. 9. The LUT is used when executing γ conversion to convert the input image data constituted with R image data, G image data and B image data, each assuming the 8-bit length, to output image data made up with R image data, G image data and B image data, each assuming the 8-bit length and corresponding to the predetermined gradation characteristics (e.g., γ=2.2). As is the inverse γ conversion described earlier, the γ conversion is executed exclusively for the signals representing the R color component, the G color component and the B color component, regardless of whether or not the pixels at the liquid crystal panel 112 of the projection unit 110 include pixels representing a component other than the R, G and B color components. It is to be noted that the LUT is configured by assuming a bit length greater than the bit length of the gradation data, in order to prevent any gradation loss during the calculation processing and is stored in the flash memory 101B.

In addition, the projector apparatus 1 in the second embodiment executes correction impossible distribution image generation processing, which is different from that executed in the projector apparatus 1 in the first embodiment. The following is a detailed description of the processing executed in step S53 (see FIG. 9) in the second embodiment to generate a correction impossible distribution image B03, given in reference to the flowchart presented in FIG. 33.

Figure 33:
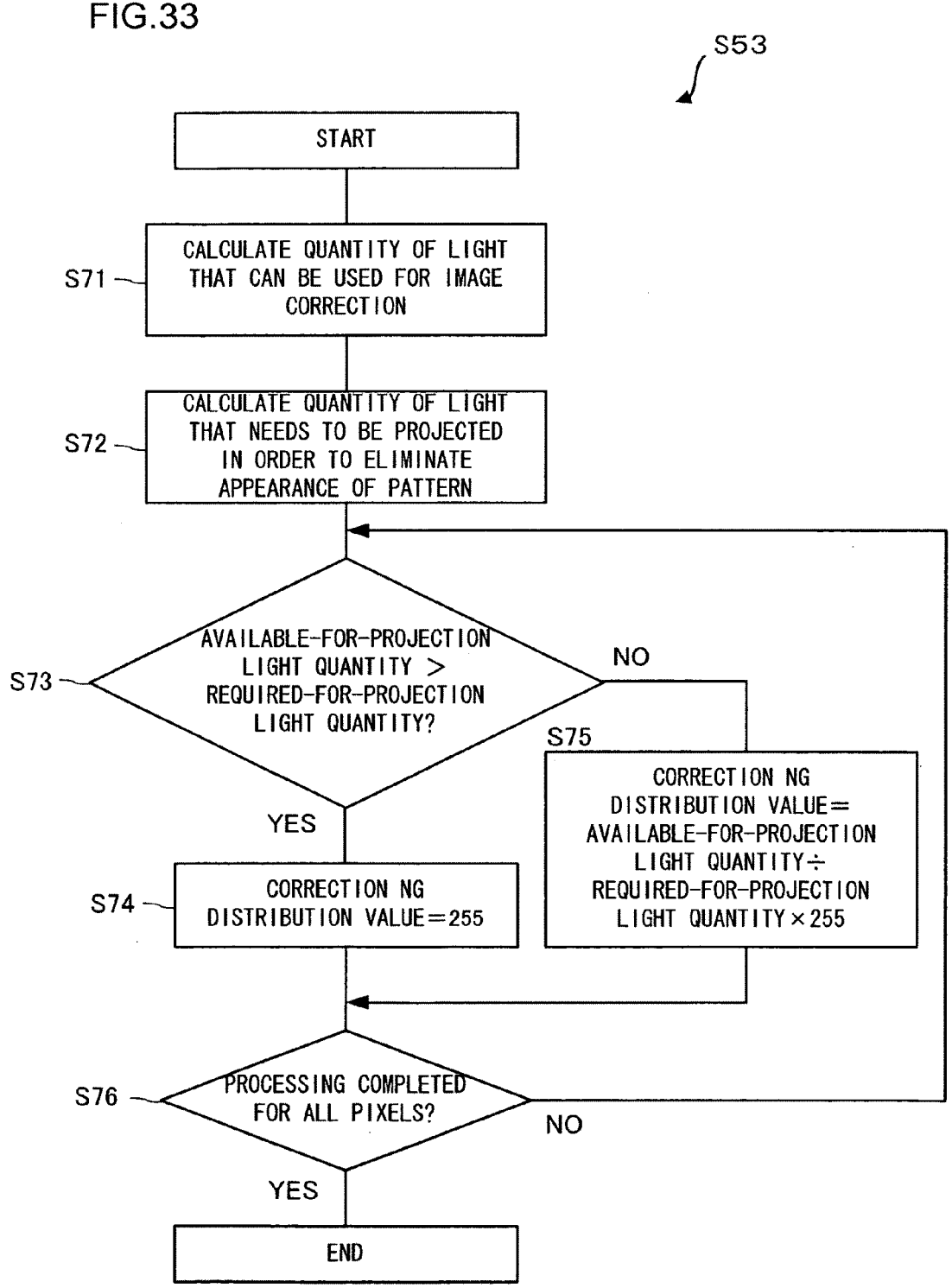
FIG. 33 presents a flowchart of the processing executed in the second embodiment to generate a correction impossible distribution image.

In step S71 in FIG. 33, the control circuit 101 calculates the output (the quantity of light) from the projection unit 110 that can be used in the input image correction. In more specific terms, assuming that the output of the projection unit 100 is 255, representing the maximum output value corresponding to 8-bit data, the control circuit 101 subtracts the pixel value in the ambient light pattern correction image F01 from 255 as expressed; $(R_{M1}, G_{M1}, B_{M1})_i = (255-R_{F01}, 255-G_{F01}, 255-B_{F01})_i$. The light output from the projection unit 110 includes the light used to cancel out the appearance of the base pattern, stains and the like on the projection surface from the projection image and the light used to project the image. In other words, only the light that is not used for canceling out the appearance of the base pattern, stains and the like on the projection surface can be used to project the image. Accordingly, the control circuit 101 subtracts the pixel value in the ambient light pattern correction image F01 corresponding to the quantity of light used to cancel the appearance of the base pattern, stains and the like on the projection surface from the maximum output value. The value $(R_{M1}, G_{M1}, B_{M1})_i$ thus calculated, representing the quantity of light that can be used to project the image, is to be referred to as an available-for-projection light quantity.

In step S72, the control circuit 101 calculates the quantity of light to be output for purposes of eliminating (canceling) the appearance of the base pattern, stains and the like on the projection surface. More specifically, the control circuit 101 executes calculation expressed as; $(R_{N1}, G_{N1}, B_{M1})_i = (R_{C01}/R_{A03}, G_{C01}/G_{A03}, B_{C01}/B_{A03})_i$ by dividing the linearized image C01 by the reflectance distribution image A03. As described earlier, the projection unit 100 projects an image obtained by dividing the linearized image C01 by the reflectance distribution image A03 as the projection image. In other words, in the image projected by the projection unit 110, an area corresponding to an area on the projection surface with low reflectance (an area greatly affected by the base pattern, a stain or the like) is projected with higher luminance (higher brightness) in correspondence to the lower reflectance. Thus, $(R_{N1}, G_{N1}, B_{N1})_i$ calculated as described above represents the quantity of light that should be output from the projection unit 110 in order to eliminate (cancel) the appearance of the base pattern, stains and the like on the projection surface. The value represented by $(R_{N1}, G_{N1}, B_{N1})_i$ is to be referred to as a required-for-projection light quantity.

In step S73, the control circuit 101 sequentially compares the available-for-projection light quantity and the required-for-projection light quantity pixel by pixel. If "available-for-projection light quantity">"required-for-projection light quantity", i.e., if $(R_{M1}, G_{M1}, B_{M1})_i > (R_{N1}, G_{N1}, B_{N1})_i$ is true, the control circuit 101 makes an affirmative decision in step S73 and the operation proceeds to step S74 However, if the "available-for-projection light quantity" is not greater than the "required-for-projection light quantity", i.e., if $(R_{M1}, G_{M1}, B_{M1})_i > (R_{N1}, G_{N1}, B_N1)_i$ is not true, a negative decision is made in step S73 and the operation proceeds to step S75.

In step S74, the control circuit 101 sets the correction impossible distribution value so that $(R_{B01}, G_{B01}, B_{B01})_i = (255, 255, 255)$, before the operation proceeds to step S76. In step S75, the control circuit 101 sets the correction impossible distribution value so that $(R_{B01}, G_{B01}, B_{B01})_i = (R_{M1}/R_{N1}, G_{M1}/G_{N1}, B_{M1}/RB_{N1})_i \times 255$, before the operation proceeds to step S76.

The processing executed in step S76 is similar to the processing executed in step S76 in the flowchart presented in FIG. 11.

Figure 34:
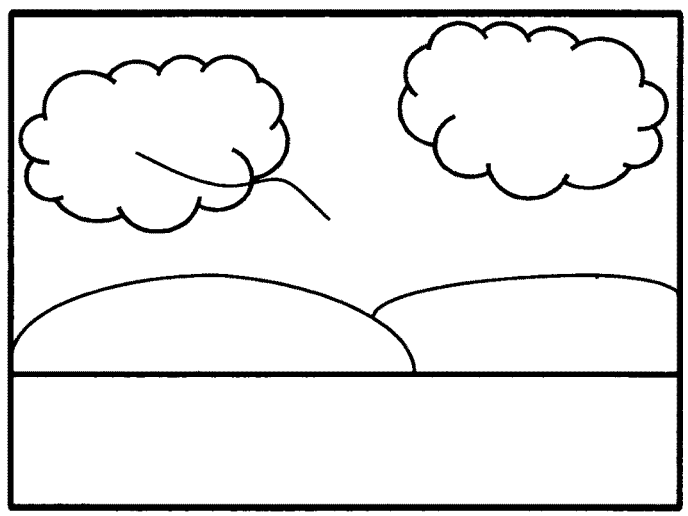
FIG. 34 is a schematic illustration presenting an example of a corrected projection image that is projected onto a projection surface in the second embodiment.
Figure 35:
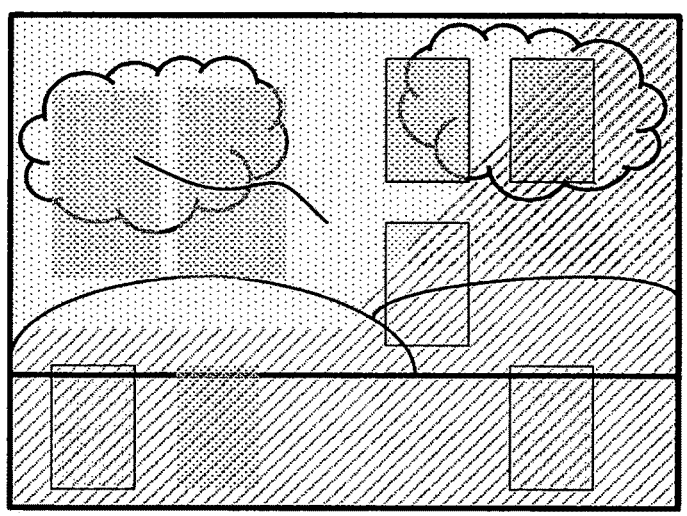
FIG. 35 is a schematic illustration presenting an example of a projection image projected onto a projection surface without correction in the second embodiment.
Figure 36:
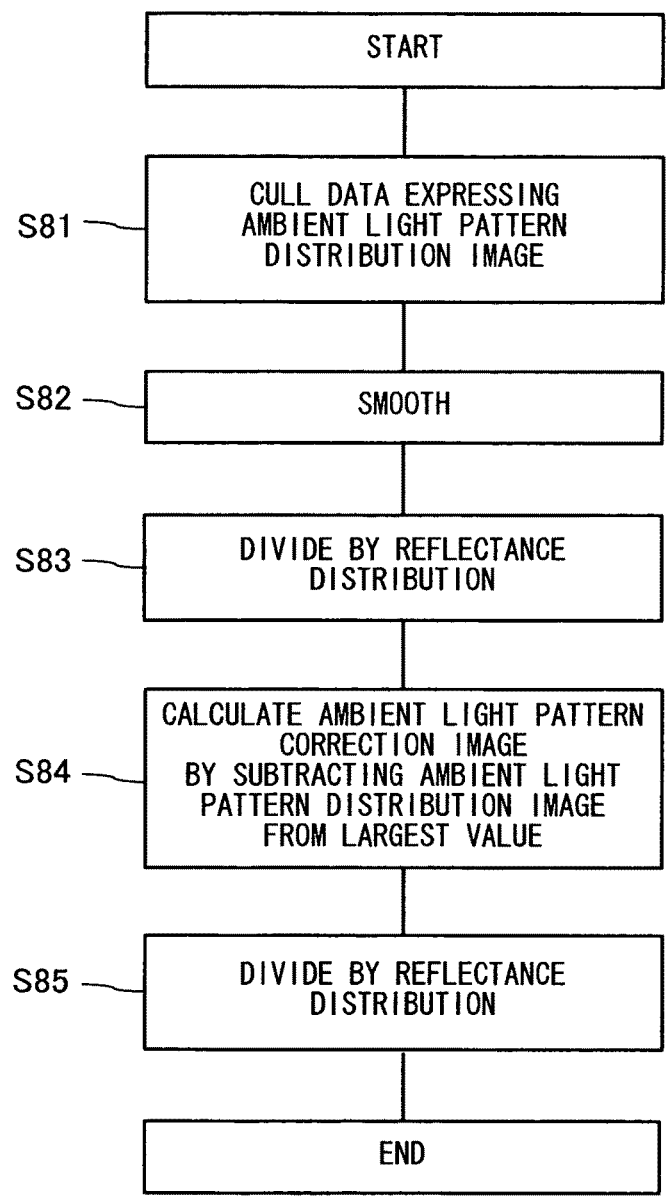
FIG. 36 presents a flowchart of processing that may be executed in a variation to determine through calculation an ambient light pattern correction image.
Figure 37:
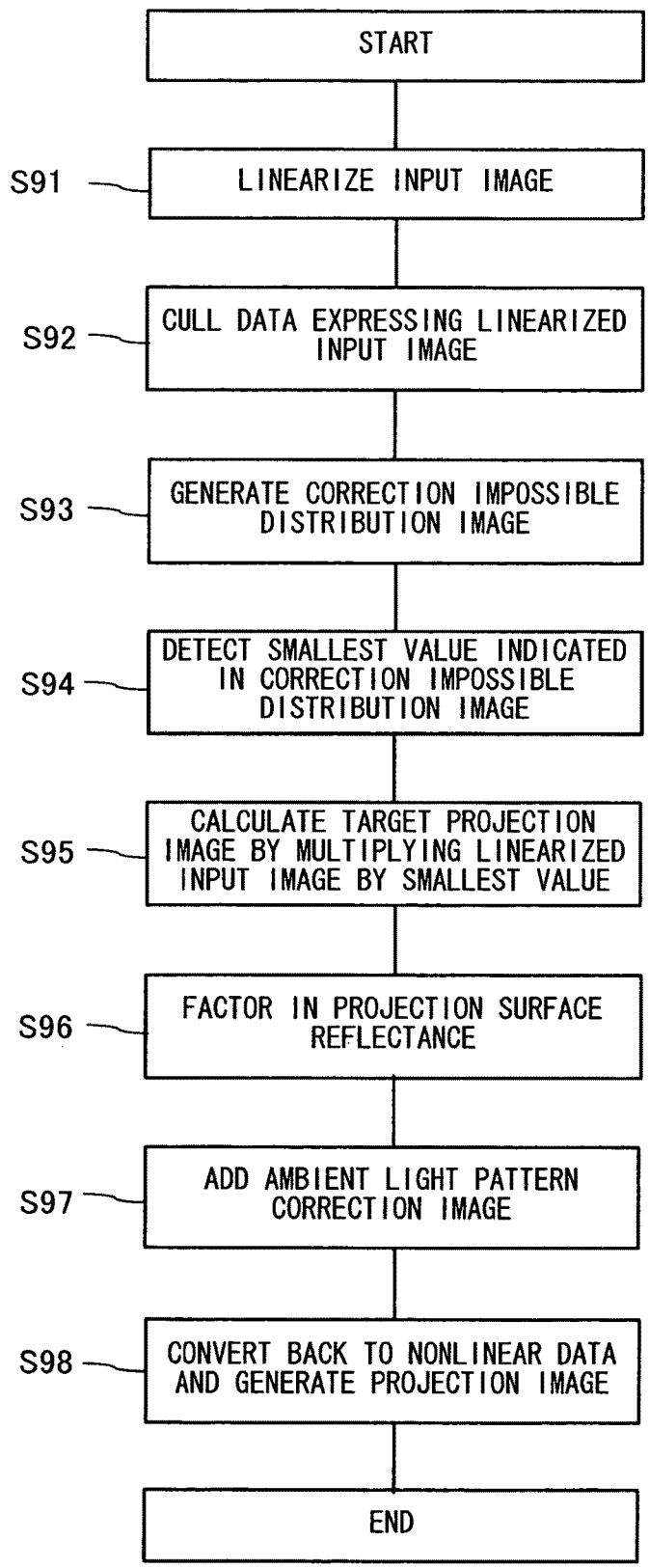
FIG. 37 presents a flowchart of the processing executed in a variation to generate a projection image.
Figure 38:
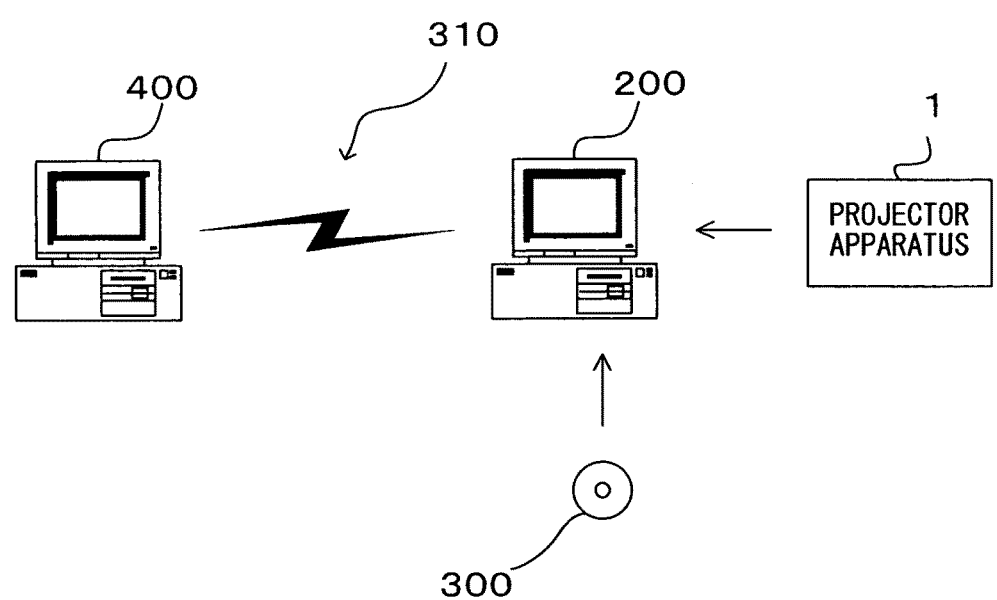
FIG. 38 illustrates the overall structure of a system configured to provide a program product.

FIG. 34 presents an example of a projection image that may be projected onto the projection surface after undergoing the correction at the projector apparatus 1 as described above. The appearance of the pattern on the projection surface is rendered less visible. FIG. 35 presents, for purposes of comparison, an example of a projection image that may be projected directly onto the projection surface without correcting the input image as described above. Unlike the projection image in FIG. 34, the base pattern on the projection surface shows up in the projection image in FIG. 35.

In addition to the advantages (2), (4) and (5) of the first embodiment, the following advantages are achieved through the second embodiment described above.

(1) The projector apparatus 1 includes a projection unit 110, which projects an image onto a projection surface, a memory card I/F 105 from which image data are input and a control circuit 101. When the brightness of the projection image projected via the projection unit 110 needs to be enhanced, the control circuit 11 detects the reflectance distribution A03 at the projection surface, detects the ambient light pattern distribution image A01 at the projection surface and smooths the reflectance distribution A03 and the ambient light pattern distribution image A01. The control circuit 101 then corrects the input image data C01 based upon the smoothed reflectance distribution, the smoothed ambient light pattern distribution image and the input/output characteristics of the projection unit 110 exclusively related to the color component signals and controls the projection unit 110 so as to project an image based upon the corrected image data. As a result, the input image can be corrected so as to cancel out the appearance of any stains or base pattern at the projection surface without greatly compromising the quality of the projection image. Through the smoothing processing, the image data can be corrected in such a manner that corrected areas do not become conspicuous.

The inverse γ conversion (S51) and the γ conversion (S61) are both executed by using an LUT when correcting the image data as described earlier. The LUT is configured so that even when the pixels at the liquid crystal panel 112 of the projection unit 110 include pixels representing a component other than the R color component, the G color component or the B color component, which are provided for purposes of brightness enhancement, the inverse γ conversion and the γ conversion are executed exclusively for signals representing the R color component, the G color component and the B color component. In other words, no signal representing a component other than the R, G or B color component undergoes the conversion processing. As long as the conversion processing is executed exclusively for signals representing the R color component, the G color component and the B color component, the addition rule (W(whiteness)=R+G+B) is applicable, and thus, the LUT can be structured, for instance, two dimensionally with ease.

However, if the inverse γ conversion and the γ conversion were executed for all the signals, including the signals representing a component other than the R, G and B color components and used for purposes of brightness enhancement as well as the R, G and B color component signals, the addition rule would no longer apply, since W(whiteness)=R+G+B+ alpha (light that is not filtered through color filters). Under such circumstances, an LUT with a more complex structure, e.g., a three-dimensional structure, would be required. The abridged inverse γ conversion and γ conversion executed by using a simpler LUT, to which the addition rule is applicable, rather than the full inverse γ conversion and γ conversion executed with a complex LUT such as that described above, is advantageous in that the processing onus on the control circuit 11 is reduced and in that the contrast of the input image is not unnecessarily lowered. The brightness-enhancing pixels mentioned above are often included in the liquid crystal panel 112 of a projector apparatus with only a small quantity of light provided from its light source, such as a compact, battery-driven projector apparatus.

A screen onto which the projection image will normally be projected is often almost achromatic with a low level of color saturation, since the user will normally prefer to project an image onto an essentially colorless surface rather than onto a colored surface. Provided that the level of color saturation at the projection surface is high, the full inverse γ conversion and γ conversion will more effectively render the appearance of the base pattern less noticeable. However, if the level of color saturation at the projection surface is not high, the appearance of the base pattern will be rendered acceptably unnoticeable even through the abridged inverse γ conversion and γ conversion.

(2) The control circuit 101 generates a lowered brightness distribution image H01, which indicates the possible/impossible distribution, based upon the correction information (ambient light pattern correction image) F01, the input image data C01, the reflectance distribution A03 and the input/output characteristics mentioned earlier. The control circuit 101 individually converts the data expressing the lowered brightness distribution image H01 and the input image data C01 so that they each assume a size smaller than the data size of the image to be projected by the projection unit 110. The control circuit 11 then corrects the input image data C01 by using the lowered brightness distribution image having undergone the size conversion, the input image having undergone the size conversion, the reflectance distribution and the correction information (ambient light pattern correction image). As a result, the onus of the calculation processing is lightened compared to that of the calculation processing that would have to be executed in conjunction with data in the initial data sizes, and thus, the processing can be completed in less time.

(Variation 1)

While the projection surface reflectance distribution is detected by obtaining through calculation an image indicating the projection surface reflectance distribution in the embodiment described above, the projection surface reflectance distribution may be detected through a method other than that adopted in the embodiment. For instance, the control circuit 101 may detect the reflectance distribution based upon the intensity of the light projected from the projection unit 110 and the intensity of the light reflected from the projection surface, which is detected via the imaging unit 120.

(Variation 2)

While the description is given above in reference to the embodiment on an example in which varying correction quantities can be set within the image plane, the present invention may be adopted in uniform correction executed by setting a uniform correction quantity for the whole image plane. In such a case, the control circuit 101 should execute the processing in the flowchart presented in FIG. 32 instead of the processing in the flowchart in FIG. 5 and should also execute the processing in the flowchart presented in FIG. 33 instead of the processing in the flowchart in FIG. 9.

(Processing Executed to Obtain Ambient Light Pattern Correction Image Through Calculation)

In reference to the flowchart presented in FIG. 32, the processing executed in step S22 (see FIG. 3) mentioned earlier to obtain through calculation the ambient light pattern correction image is described in detail.

In step S81 in FIG. 32, the control circuit 101 culls some of the pixels constituting the ambient light pattern distribution image A01. Assuming that the initial ambient light pattern distribution image A01 is constituted with, for instance, 1024 (across×768 (down) pixels, the control circuit 101 obtains an ambient light pattern distribution image a01 with a reduced size of 256×192 pixels by culling the data to ¼ both across and down. FIG. 15 presents an example of the ambient light pattern distribution image a01.

In step S82, the control circuit 101 executes low pass filter processing (e.g., moving average processing) in order to smooth the reduced ambient light pattern distribution image a01. FIG. 16 presents an example of an image that may be obtained by smoothing the ambient light pattern distribution image a01.

It is to be noted that as explained earlier in reference to the embodiment, the size of the kernel may be adjusted as necessary and the smoothing processing may be executed by using a median filter instead of a low pass filter.

In step S83, the control circuit 101 determines the largest value indicated in the smoothed ambient light pattern distribution image. In other words, the control circuit 101 obtains the largest smoothed ambient light pattern distribution value in the overall image. In step S84, the control circuit 101 obtains through calculation an ambient light pattern correction image DD01 by subtracting the ambient light pattern distribution image A01 from the largest value. In more specific terms, the control circuit 101 obtains the image through calculation expressed as; $(R_{DD01}, G_{DD01}, B_{DD01})_i = (R_{max} - R_{A01}, G_{max} - G_{A01}, B_{max} - B_{A01})_i$. It is to be noted that $(R_{max}, G_{max}, B_{max})$ above represents the largest value.

In step S85, the control circuit 101 obtains through calculation an ambient light pattern correction image FF01 having undergone reflectance correction by dividing the ambient light pattern correction image DD01 by the reflectance distribution image A03. More specifically, the control circuit 101 obtains the image through calculation expressed as; $(R_{FF01}, G_{FF01}, B_{FF01})_i = (R_{DD01}/R_{A03}, G_{DD01}/G_{A03}, B_{DD01}/B_{A03})_i$, before ending the processing in FIG. 32.

(Projection Image Generation Processing)

In reference to the flowchart presented in FIG. 33, an example of processing that may be executed in step S24 (see FIG. 3) to generate the projection image is described in detail.

In step S91 in FIG. 33, the control circuit 101 obtains an image (hereafter referred to as a linearized image C01) by individually linearizing the pixel values indicated in the input image (e.g., 1024×768 pixels). The control circuit 101 may calculate linearized values by, for instance, sequentially executing a pixel-by-pixel inverse γ conversion in reference to a lookup table (LUT). Such an LUT should be stored in the flash memory 101B.

In step S92, the control circuit 101 culls some of the pixels constituting the linearized image C01. Namely, the control circuit 101 obtains a linearized image c01 with a reduced size of 256×192 pixels by culling the data to ¼ the initial pixel size (1024×768) both across and down.

In step S93, the control circuit 101 creates a correction impossible distribution image B03, and then the operation proceeds to step S94. The correction impossible distribution image B03 is created through processing identical to that described earlier.

In step S94, the control circuit 101 culls some of the pixels constituting the correction impossible distribution image B03 to ¼ of the initial size both across and down so as to obtain a correction impossible distribution image b03 with a reduced size of 256×192 pixels and also detects the smallest value among the values indicated in the correction impossible distribution image b03. In other words, the control circuit 101 ascertains the smallest correction impossible distribution value detected through the entire image.

In step S95, the control circuit 101 obtains through calculation a target projection image JJ01 by multiplying the linearized image C01 by the smallest value detected as described above and then the operation proceeds to step S96. In more specific terms, the control circuit 101 obtains the image through calculation expressed as; $(R_{JJ01}, G_{JJ01}, B_{JJ01})_i = (R_{C01} \times R_{min}, G_{C01} \times G_{min}, B_{C01} \times B_{min})_i$. It is to be noted that $(R_{min}, G_{min}, B_{min})$ above represents the smallest value.

In step S96, the control circuit 101 obtains through calculation a target projection image KK01 resulting from reflectance correction by dividing the target projection image JJ01 by the reflectance distribution image A03 and then the operation proceeds to step S97. More specifically, the control circuit 101 obtains the image through calculation expressed as; $(R_{KK01}, G_{KK01}, B_{KK01})_i = (R_{JJ01}/R_{A03}, G_{JJ01}/G_{A03}, B_{JJ01}/B_{A03})_i$.

In step S97, the control circuit 101 obtains through calculation a projection image LL01 by adding the ambient light pattern correction image FF01 to the target projection image KK01 resulting from the reflectance correction and then the operation proceeds to step S98. In more specific terms, the control circuit 101 obtains the image through calculation expressed as; $(R_{LL01}, G_{LL01}, B_{LL01})_i = (R_{KK01} + R_{FF01}, G_{KK01} + G_{FF01}, B_{KK01} + B_{FF01})_i$.

In step S98, the control circuit 101 obtains the actual projection image LL02 converted back to the nonlinear data format through γ conversion executed on the projection image LL01. The γ conversion should be executed by using an LUT stored in the flash memory 101B.

The following advantages are achieved through Variation 2 described above.

(1) The control circuit 101 assumes a uniform ambient light pattern distribution over the entire projection image plane based upon the largest value indicated in the ambient light pattern distribution with the altered data size and obtains through calculation correction information (ambient light pattern correction image) based upon the uniform distribution value for each of specific areas defined on the projection image plane. By assuming such uniformity in the ambient light pattern distribution, the onus of the calculation processing is lessened compared to that of processing executed without assuming uniformity and consequently, the processing can be executed within a shorter period of time.

(2) The control circuit 101 assumes a uniform lowered brightness distribution through the entire projection image plane based upon the smallest value indicated in the lowered brightness distribution with the altered data size and executes the arithmetic operation needed for correction based upon the uniform lowered brightness distribution. By assuming such uniformity in the lowered brightness distribution, the onus of the calculation processing is lessened compared to that of processing executed without assuming uniformity and consequently, the processing can be executed within a shorter period of time.

A program enabling input image correction processing executed as described above may be provided to the projector apparatus 1 as a computer program product adopting any of various modes, e.g., via a recording medium such as the memory card 150 having the program recorded therein and via the external interface (I/F) circuit 104 connected with a communication network.

The program enabling the control described above may be provided in a recording medium such as a CD-ROM or in data signals transmitted through the Internet or the like. FIG. 34 illustrates how the program may be provided. A reproduction apparatus 200 receives the program via a CD-ROM 300. The reproduction apparatus 200 is also capable of connecting with a communication line 310. A computer 400 is a server computer that provides the program stored in a recording medium such as a hard disk. The communication line 310 may be the Internet or a communication network for personal computer communication, or it may be a dedicated communication line. The computer 400 reads out the program from the hard disk and transmits the program to the reproduction apparatus 200 via the communication line 310. Namely, the program embodied as data signals carried on a carrier wave can be transmitted via the communication line 310. In other words, the program can be distributed as a computer-readable computer program product assuming any of various modes including a recording medium and a carrier wave.

The above described embodiments are examples, and various modifications can be made without departing from the scope of the invention.

What is claimed is:

1. A projector apparatus, comprising:
a projection unit that projects an image onto a projection surface;
a reflectance distribution detection unit that detects a reflectance distribution at the projection surface;
an ambient light pattern distribution image obtaining unit that obtains an ambient light pattern distribution image which indicates a density distribution of a base pattern at the projection surface caused by an ambient light;
a smoothing unit that smooths the ambient light pattern distribution image;
an input unit that inputs image data;
an ambient light pattern correction image generating unit that generates an ambient light pattern correction image based upon the ambient light pattern distribution image, the ambient light pattern distribution image having been smoothed by the smoothing unit and the reflectance distribution detected by the reflectance distribution detection unit;
a correction unit that corrects the input image data based upon the ambient light pattern correction image and input/output characteristics of the projection unit; and
a control unit that controls the projection unit so as to project the image based upon the image data having been corrected.

2. A projector apparatus according to claim 1, wherein:
the input/output characteristics of the projection unit indicate an extent to which brightness of a projection image is enhanced.

3. A projector apparatus, comprising:
a projection unit that projects an image onto a projection surface;
a reflectance distribution detection unit that detects a reflectance distribution at the projection surface;
a density distribution detection unit that detects a density distribution of a base pattern at the projection surface;
a smoothing unit that smooths the reflectance distribution and the density distribution;
an input unit that inputs image data;
a correction unit that corrects the input image data based upon the smoothed reflectance distribution, the smoothed density distribution and input/output characteristics of the projection unit; and
a control unit that controls the projection unit so as to project the image based upon the image data having been corrected,
wherein:
the input/output characteristics of the projection unit indicate an extent to which brightness of a projection image is enhanced; and
the correction unit executes size conversion so as to convert a data size of data expressing the density distribution to a size smaller than a data size of the image projected by the projection unit and obtains correction information through calculation based upon the reflectance distribution and the density distribution having undergone the size conversion, the correction information being for using to cancel out an appearance of the base pattern at the projection surface.

4. A projector apparatus according to claim 3, wherein:
the correction unit also generates a possible/impossible distribution image based upon the correction information, the image data input from the input unit, the reflectance distribution and the extent to which the brightness of the projection image is enhanced, the possible/impossible distribution image indicating a possible/impossible distribution with regard to cancellation of the appearance of the base pattern;
executes size conversion so as to convert data sizes of data expressing the possible/impossible distribution image and the input image data each to a size smaller than the data size of the image projected by the projection unit; and
corrects the input image data by using the possible/impossible distribution image having undergone the size conversion, the input image data having undergone the size conversion, the reflectance distribution and the correction information.

5. A projector apparatus according to claim 3, wherein:
the correction unit obtains a plurality of sets of the correction information through calculation based upon the density distribution having undergone the size conversion, each set of the correction information being in correspondence to each specific area present in a projection image plane respectively.

6. A projector apparatus according to claim 3, wherein:
the correction unit adjusts the density distribution to achieve uniformity at a projection image plane based upon a maximum value in the density distribution having undergone the size conversion and obtains a plurality of sets of the correction information through calculation based upon the density distribution achieving uniformity, each set of the correction information being in correspondence to each specific area present in a projection image plane respectively.

7. A projector apparatus according to claim 4, wherein:
the correction unit indicates the extent to which the brightness is enhanced based upon a whiteness component enhancement level.

8. A projector apparatus according to claim 4, wherein:
the correction unit executes arithmetic operations required to correct the input image data based upon the possible/impossible distribution having undergone the size conversion, each of the arithmetic operations being executed in correspondence to each specific area present in a projection image plane respectively.

9. A projector apparatus according to claim 4, wherein:
the correction unit adjusts pixel values of the possible/impossible distribution image so as to achieve uniformity at a projection image plane based upon a minimum pixel value indicated in the possible/impossible distribution image having undergone the size conversion and executes arithmetic operation required to correct the input image data based upon the possible/impossible distribution image achieving uniformity.

10. A projector apparatus according to claim 1, wherein:
when the projection unit enhances brightness of a projection image, the correction unit corrects the input image data based upon the smoothed reflectance distribution, the smoothed density distribution and input/output characteristics of the projection unit exclusively related to color component signals.

11. A projector apparatus according to claim 10, wherein:
the projection unit is equipped with an optical image generating element that includes pixels corresponding to the color component signals based upon the image data and pixels used for brightness enhancement and the projection unit projects an image generated by the optical image generating element.

12. A projector apparatus, comprising:
a projection unit that projects an image onto a projection surface;
a reflectance distribution detection unit that detects a reflectance distribution at the projection surface;
a density distribution detection unit that detects a density distribution of a base pattern at the projection surface;
a smoothing unit that smooths the reflectance distribution and the density distribution;
an input unit that inputs image data;
a correction unit that corrects the input image data based upon the smoothed reflectance distribution, the smoothed density distribution and input/output characteristics of the projection unit; and
a control unit that controls the projection unit so as to project the image based upon the image data having been corrected,
wherein:
when the projection unit enhances brightness of a projection image, the correction unit corrects the input image data based upon the smoothed reflectance distribution, the smoothed density distribution and input/output characteristics of the projection unit exclusively related to color component signals; and
the correction unit executes size conversion so as to convert a data size of data expressing the density distribution to a size smaller than a data size of the image projected by the projection unit and obtains correction information through calculation based upon the reflectance distribution and the density distribution having undergone the size conversion, the correction information being for using to cancel out an appearance of the base pattern at the projection surface.

13. A projector apparatus according to claim 12, wherein:
the correction unit also generates a possible/impossible distribution image based upon the correction information, the image data input from the input unit, the reflectance distribution and the input/output characteristics, the possible/impossible distribution image indicating a possible/impossible distribution with regard to cancellation of the appearance of the base pattern;
executes size conversion so as to convert data sizes of data expressing the possible/impossible distribution image and the input image data each to a size smaller than the data size of the image projected by the projection unit; and
corrects the input image data by using the possible/impossible distribution image having undergone the size conversion, the input image data having undergone the size conversion, the reflectance distribution and the correction information.

14. A projector apparatus according to claim 12, wherein:
the correction unit obtains a plurality of sets of the correction information through calculation based upon the density distribution having undergone the size conversion, each set of the correction information being in correspondence to each specific area present in a projection image plane respectively.

15. A projector apparatus according to claim 12, wherein:
the correction unit adjusts the density distribution to achieve uniformity at a projection image plane based upon a maximum value in the density distribution having undergone the size conversion and obtains a plurality of sets of the correction information through calculation based upon the density distribution achieving uniformity, each set of the correction information being in correspondence to each specific area present in a projection image plane respectively.

16. A projector apparatus according to claim 13, wherein:
the correction unit executes arithmetic operations required to correct the input image data in correspondence to each specific area present in a projection image plane based upon the possible/impossible distribution having undergone the size conversion, each of the arithmetic operations being executed in correspondence to each specific area present in a projection image plane respectively.

17. A projector apparatus according to claim 13, wherein:
the correction unit adjusts the possible/impossible distribution so as to achieve uniformity at a projection image plane based upon a minimum value in the possible/impossible distribution having undergone the size conversion and executes arithmetic operation required to correct the input image data based upon the possible/impossible distribution achieving uniformity.

18. A computer-readable program product encoded in a non-transitory, computer readable storage medium, the computer-readable program product containing a computer-executable projection image correcting program that enables a computer to execute:
projection processing for processing an image onto a projection surface;
detection processing for detecting a reflectance distribution at the projection surface;
image obtaining processing for obtaining an ambient light pattern distribution image which shows a density distribution of a base pattern at the projection surface caused by an ambient light;

smoothing processing for smoothing ambient light pattern distribution image;
input processing for inputting image data;
correction image generating processing for generating an ambient light pattern correction image based upon the ambient light pattern distribution image, the ambient light pattern distribution image having been smoothed by the smoothing processing and the reflectance distribution detected by the detection processing;
correction processing for correcting the image data having been input based upon the ambient light pattern correction image and input/output characteristics of a projector apparatus; and
processing for projecting an image based upon the image data having been corrected.

19. A computer-readable program product encoded in a non-transitory, computer readable storage medium, the computer-readable program product containing a computer-executable projection image correcting program according to claim 18, wherein:
when the projector apparatus enhances brightness of a projection image, the projection image correcting program enables a computer to execute the correction processing for correcting the image data having been input based upon the smoothed ambient light pattern distribution image and input/output characteristics of the projector apparatus exclusively related to color component signals.

20. A projector apparatus according to claim 1, further comprising:
a correction possible/impossible distribution image generating unit that generates a correction possible/impossible distribution image which indicates a possible/impossible distribution with regard to cancellation of an appearance of the base pattern, based upon the image data input from the input unit, the reflectance distribution, the ambient light pattern correction image and the input/output characteristics of the projection unit; and
a correction possible/impossible distribution image smoothing unit that smooths the correction possible/impossible distribution image, wherein:
the correction unit corrects the input image data based upon the correction possible/impossible distribution image having been smoothed by the correction possible/impossible distribution image smoothing unit, the reflectance distribution and the ambient light pattern correction image.

21. A projector apparatus, comprising:
a projection unit that projects an image onto a projection surface;
a reflectance distribution detection unit that detects a reflectance distribution at the projection surface;
an input unit that inputs image data;
an image generating unit that generates a correction possible/impossible distribution image which indicates a possible/impossible distribution with regard to cancellation of a base pattern at the projection surface, based upon the image data input from the input unit, the reflectance distribution and input/output characteristics of the projection unit;
a smoothing unit that smooths the correction possible/impossible distribution image generated by the image generating unit;
a correction unit that corrects the input image data based upon the correction possible/impossible distribution image having been smoothed by the smoothing unit, the input image data and the reflectance distribution; and
a control unit that controls the projection unit so as to project the image based upon the image data having been corrected.

22. A computer-readable program product encoded in a non-transitory, computer readable storage medium, the computer-readable program product containing a computer-executable projection image correcting program that enables a computer to execute:
projection processing for projecting an image onto a projection surface;
detection processing for detecting a reflectance distribution at the projection surface;
input processing for inputting image data;
image generating processing for generating a correction possible/impossible distribution image which indicates a possible/impossible distribution with regard to cancellation of a base pattern at the projection surface, based upon the image data input by the input processing, the reflectance distribution and input/output characteristics of the projection apparatus;
smoothing processing for smoothing the correction possible/impossible distribution image generated by the image generating processing;
correction processing for correcting the input image data based upon the correction possible/impossible distribution image having been smoothed by the smoothing processing, the input image data and the reflectance distribution; and
processing for projecting an image based upon the image data having been corrected.

* * * * *